(12) United States Patent
Ribaut et al.

(10) Patent No.: US 12,023,640 B2
(45) Date of Patent: Jul. 2, 2024

(54) AQUEOUS DISPERSION OF MICROCAPSULES, AND USES THEREOF

(71) Applicant: TAKASAGO INTERNATIONAL CORPORATION, Tokyo (JP)

(72) Inventors: Tiphaine Ribaut, Paris (FR); Laura Le Moue, Paris (FR); Jeremy Povazson, Paris (FR); William Bett, Paris (FR); Jonathan Warr, Paris (FR)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 245 days.

(21) Appl. No.: 17/826,481

(22) Filed: May 27, 2022

(65) Prior Publication Data
US 2022/0387955 A1 Dec. 8, 2022

(30) Foreign Application Priority Data
May 27, 2021 (EP) .................................. 21305696

(51) Int. Cl.
| | | |
|---|---|---|
| *B01J 13/14* | (2006.01) | |
| *C08F 2/22* | (2006.01) | |
| *C08F 220/18* | (2006.01) | |
| *C11D 3/22* | (2006.01) | |
| *C11D 3/37* | (2006.01) | |
| *C11D 3/50* | (2006.01) | |
| *C11D 17/00* | (2006.01) | |

(52) U.S. Cl.
CPC ................ *B01J 13/14* (2013.01); *C08F 2/22* (2013.01); *C08F 220/1804* (2020.02); *C11D 3/222* (2013.01); *C11D 3/3765* (2013.01); *C11D 3/505* (2013.01); *C11D 17/0013* (2013.01); *C08F 2800/20* (2013.01)

(58) Field of Classification Search
CPC ....... B01J 13/14; C08F 2/22; C08F 220/1804; C08F 2800/20; C11D 3/222; C11D 3/3765; C11D 3/505; C11D 17/0013
See application file for complete search history.

(56) References Cited

U.S. PATENT DOCUMENTS

| | | | | |
|---|---|---|---|---|
| 9,464,263 B2 * | 10/2016 | Aussant | .................... | A61K 8/11 |
| 9,895,297 B2 * | 2/2018 | Ribaut | ...................... | A61K 8/11 |
| 10,059,907 B2 * | 8/2018 | Ribaut | ...................... | B01J 13/14 |

FOREIGN PATENT DOCUMENTS

| | | |
|---|---|---|
| CN | 107868161 A | 4/2018 |
| CN | 109925985 A | 6/2019 |
| EP | 2 865 443 A1 | 4/2015 |

OTHER PUBLICATIONS

European Search Report, completed on Nov. 12, 2021, for European Application No. 21 30 5696.
Database WPI Week 201966, Thomson Scientific, London, GB; AN 2019-597258, XP002804748.
Database WPI Week 201830, Thomson Scientific, London, GB; AN 2018-271342, XP002804749.

* cited by examiner

*Primary Examiner* — Rabon A Sergent
(74) *Attorney, Agent, or Firm* — Baker Botts L.L.P

(57) ABSTRACT

The invention relates to an aqueous dispersion of microcapsules, said microcapsules comprising a hydrophobic core and a polymeric shell wherein said polymeric shell is formed of the reaction product of (i) at least one monofunctional or multifunctional α,β-unsaturated carbonyl compound, and (ii) at least one nanocellulose or microcrystalline cellulose. The invention also relates to a process for the manufacture of such an aqueous dispersion, as well as consumer products containing an aqueous dispersion of microcapsules according to the invention.

20 Claims, 1 Drawing Sheet

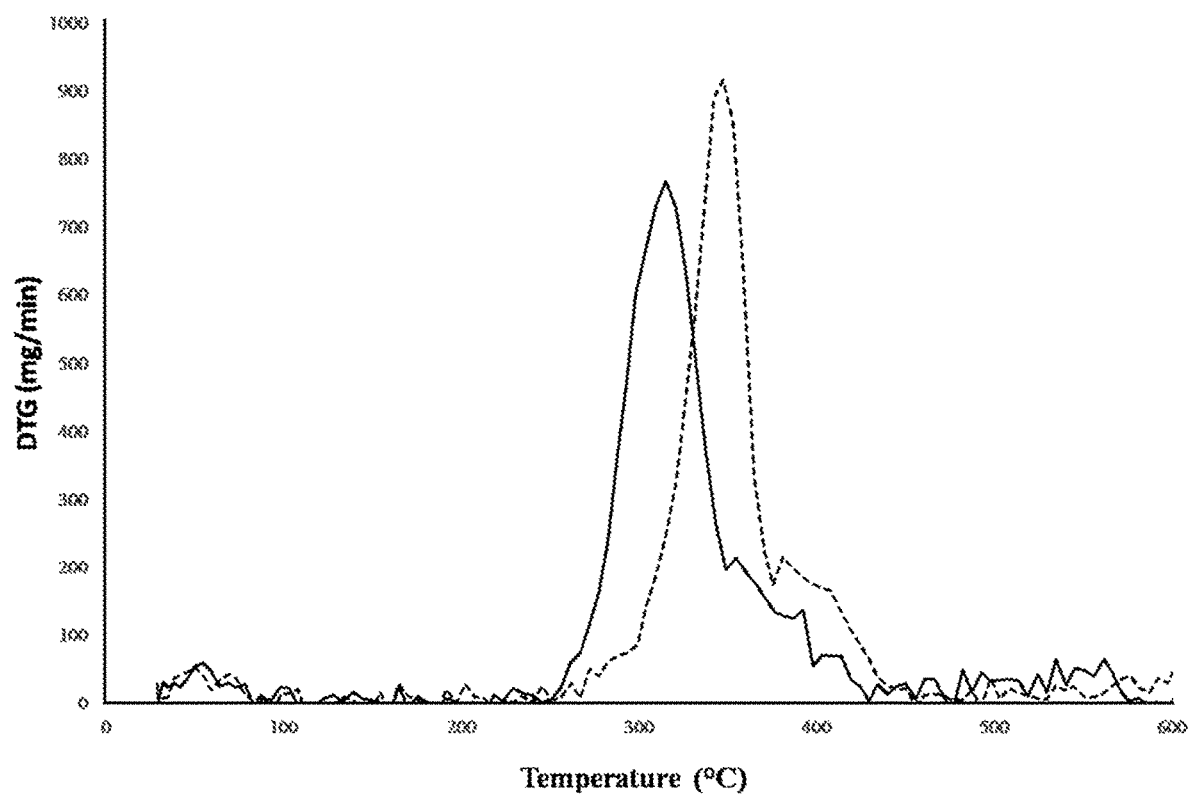

AQUEOUS DISPERSION OF MICROCAPSULES, AND USES THEREOF

CROSS REFERENCE TO RELATED APPLICATIONS

This application claims priority to European Application No. 21 305 696.3 filed on May 27, 2021, the contents of which are hereby incorporated by reference herein in its entirety.

FIELD OF THE INVENTION

The present invention relates to an aqueous dispersion of microcapsules which comprise a hydrophobic core enclosed within a shell, a process for the manufacture of an aqueous dispersion of microcapsules according to the invention, as well as consumer products (such as laundry products, personal care products and cosmetic products) containing an aqueous dispersion of microcapsules according to the invention.

BACKGROUND

There is continuing interest in the preparation of fragrance compositions and in the use of such compositions in consumer products. Consumers are in growing demand for perfumed products, which provide a perception of e.g. freshness and/or stimulation, which in turn reinforces consumer confidence in the efficacy of such products. Fragrance compositions can be incorporated into end products in free form and/or in encapsulated form. Microencapsulation represents a common solution to protect (e.g. upon storage) and control the delivery of hydrophobic materials such as fragrances. General descriptions and methods of preparation of microcapsules can be found in "MICROENCAPSULATION: Methods and Industrial Applications Edited by Benita and Simon (Marcel Dekker, Inc. 1996)". Microcapsules are also described in Kirk Othmer's Encyclopaedia of Chemical Technology $5^{th}$ edition. Microcapsules can be formed by a variety of techniques. Mechanically formed capsules can be formed by means, such as spray chilling, by compression of solids or by spray drying emulsions. Chemically formed capsules are produced by chemical reactions forming ionic or covalent bonds using techniques such as co-acervation, interfacial polymerisation, condensation reactions and free radical polymerisation. One type of microcapsule, referred to as a wall or shell or core-shell microcapsule, comprises a generally spherical shell of water- and oil-insoluble materials, typically a network polymer material, within which fragrance or other hydrophobic material is contained.

Over the past few years there has also been a growing demand for environmentally friendly consumer products with high stability. In this context, the Applicant has developed a biodegradable and partly bio-based dispersion of fragrance-containing microcapsules which display satisfactory olfactory properties when incorporated into consumer products, which are endowed with a reduced leakage of the material comprised in the hydrophobic core, which show improved stability performance upon storage, and improved stability performance against physical separation (creaming or sedimenting) upon storage.

SUMMARY OF THE INVENTION

The present invention relates to an aqueous dispersion of microcapsules, said microcapsules comprising a hydrophobic core and a polymeric shell, wherein said polymeric shell is formed of the reaction product of:

(i) at least one multifunctional $\alpha,\beta$-unsaturated carbonyl compound,
(ii) at least one nanocellulose or microcrystalline cellulose,
(iii) optionally, at least one monoethylenically $\alpha,\beta$-unsaturated carbonyl compound and/or poly(alkylene itaconate),
(iv) optionally, at least one monofunctional and/or multifunctional thiol compound, and
(v) optionally, at least one silyl (meth)acrylate compound, and wherein the weight ratio between the multifunctional $\alpha,\beta$-unsaturated carbonyl compound(s) (i) and the nanocellulose or microcrystalline cellulose (ii) is lower or equal to 1.

The invention also relates to a process for the manufacture of such an aqueous dispersion and to a consumer product comprising such an aqueous dispersion.

BRIEF DESCRIPTION OF THE FIGURE

FIG. 1 illustrates the first derivatives of the ThermoGravimetric Analyses (TGA) curves (the Derivative Thermo-Gravimetry (DTG) curves) for a polymer from an aqueous dispersion of microcapsules according to the invention (Ex. 2-1) and for the comparative simple blend of microcrystalline cellulose powder VIVAPUR® CS 4 FM and of a polymer from a comparative aqueous dispersion of microcapsules according to Ex. C1-1 (in plain line: DTG curve for the Ex. 2-1 polymer; in dashed line: DTG curve for the comparative simple blend of microcrystalline cellulose powder VIVAPUR® CS 4 FM and Ex. C1-1 polymer).

DESCRIPTION OF THE INVENTION

Unless otherwise stated, all percentages are weight percentages.

Unless otherwise indicated, all chemical terms have the meanings defined by the IUPAC Compendium of Chemical Terminology, $2^{nd}$ Edition compiled by A. D. McNaught and A.

Wilkinson Blackwell Scientific Publications Oxford 1997, and IUPAC Nomenclature of Organic Chemistry, published by Blackwell Scientific Publications Oxford 1993 ISBN 0632034882.

Unless otherwise indicated, "(meth)acrylate" (or "(meth) acrylic") means methacrylate (or methacrylic) and/or acrylate (or acrylic). For example, it means methacrylate (or methacrylic). For example it means acrylate (or acrylic). For example, it means methacrylate (or methacrylic) and acrylate (or acrylic).

Unless otherwise indicated, room temperature is from 20 to 25° C., and preferably 20° C. Certain substances, notably perfumery molecules, may exist as distinct isomers (or as mixture of distinct isomers). Hereinafter, they may be identified also by means of their CAS number. In these cases, the CAS number of a single isomer is reported. However, and unless otherwise indicated, the reference shall be understood to cover all existing isomers.

In the context of the present invention, the terms "dispersion" and "slurry" can be used interchangeably.

In the context of the present invention, the adjective "multifunctional", when applied to a compound, indicates that the compound comprises at least two identical reactive functions (such as (meth)acrylate or thiol).

In the context of the present invention, the various embodiments described in the various aspects of the invention can be combined.

In a first aspect, the present invention relates to an aqueous dispersion of microcapsules, said microcapsules comprising a hydrophobic core and a shell, wherein said polymeric shell is formed of the reaction product of:
(i) at least one multifunctional α,β-unsaturated carbonyl compound,
(ii) at least one nanocellulose or microcrystalline cellulose,
(iii) optionally, at least one monoethylenically α,β-unsaturated carbonyl compound and/or poly(alkylene itaconate),
(iv) optionally, at least one monofunctional and/or multifunctional thiol compound, and preferably at least one multifunctional thiol compound, and
(v) optionally, at least one silyl (meth)acrylate compound, and
wherein the weight ratio between the multifunctional α,β-unsaturated carbonyl compound(s) (i) and the nanocellulose or microcrystalline cellulose (ii) is lower or equal to 1.

Multifunctional α,β-unsaturated carbonyl compounds (i) useful to form the shell of the microcapsules are any suitable compounds comprising at least two α,β-unsaturated carbonyl functions.

The multifunctional α,β-unsaturated carbonyl compound (i) used to form the shell of the microcapsules may be a multifunctional (meth)acrylate compound, an anhydride or a multifunctional (meth)acrylamide compound.

Suitable anhydrides include methacrylic anhydride and acrylic anhydride. Suitable multifunctional (meth)acrylamides include N,N'-methylenebisacrylamide and N,N'-methylenebismethacrylamide.

In a preferred embodiment, the multifunctional α,β-unsaturated carbonyl compound (i) used to form the shell of the microcapsules is a multifunctional (meth)acrylate compound. Suitable multifunctional (meth)acrylates include di(meth)acrylates, tri(meth)acrylates, tetra(meth)acrylates, penta(meth)acrylates, and hexa(meth)acrylates.

In a preferred embodiment, the multifunctional (meth) acrylate compound is an ester of (meth)acrylic acid with a linear or branched, alicyclic, aromatic or heterocyclic ($C_2$-$C_{24}$)alcohol, preferably a ($C_2$-$C_{12}$)alcohol, or an ester of (meth)acrylic acid with a ($C_2$-$C_{24}$)polyethylene glycol, preferably a ($C_2$-$C_{12}$)polyethylene glycol. Suitable alcohols include those having a number average molecular weight of up to about 1 000 g·mol$^{-1}$. Suitable polyethylene glycols include those having a number average molecular weight of up to about 1 000 g·mol$^{-1}$, and preferably up to about 500 g·mol$^{-1}$.

In a preferred embodiment, the multifunctional (meth) acrylate compound is selected from glycerol dimethacrylate, ethylene glycol dimethacrylate, 1,3-butylene glycol dimethacrylate, 1,4-butylene glycol dimethacrylate, 1,2-propylene glycol dimethacrylate, 1,3-propylene glycol dimethacrylate, diethylene glycol dimethacrylate, 1,6-hexane diol dimethacrylate, bisphenol A dimethacrylate, bisphenol A ethoxylate dimethacrylate, pentaerythritol trimethacrylate, glycerol trimethacrylate, trimethylolpropane trimethacrylate, tris-2-hydroxyethyl isocyanurate trimethacrylate, ethoxylated pentaerythritol tetramethacrylate, 1,4-butylene glycol diacrylate, ethylene glycol diacrylate, diethylene glycol diacrylate, triethylene glycol diacrylate, neopentylglycol diacrylate, triglycerol diacrylate, 1,6-hexane diol diacrylate, trimethylolpropane triacrylate, trimethylolpropane ethoxylate triacrylate, trimethylolpropane propoxylate triacrylate, pentaerythritol triacrylate, tris-2-hydroxyethyl isocyanurate triacrylate, glycerol triacrylate, pentaerythritol tetraacrylate, di-trimethylolpropane tetraacrylate, dipentaerythritol pentaacrylate, dipentaerythritol hexaacrylate, tris[2-(acryloyloxy)ethyl]isocyanurate, 2-[4,6-bis(2-propenoyloxyethyl)-1,3,5-triazin-2-yl]ethyl prop-2-enoate, and mixtures thereof.

In a preferred embodiment, the multifunctional (meth) acrylate compound is selected from glycerol dimethacrylate, 1,4-butylene glycol dimethacrylate, ethylene glycol dimethacrylate, trimethylolpropane trimethacrylate, glycerol trimethacrylate, pentaerythritol triacrylate, 1,4-butylene glycol diacrylate, ethylene glycol diacrylate, trimethylolpropane triacrylate, glycerol triacrylate, pentaerythritol tetraacrylate, ditrimethylolpropane tetraacrylate, and mixtures thereof.

In the aqueous dispersion of microcapsules of the invention, the polymeric shell of the microcapsules also comprises nanocellulose or microcrystalline cellulose (ii).

The nanocellulose or microcrystalline cellulose (ii) is a highly crystalline particulate cellulose consisting primarily of crystallite aggregates obtained by removing amorphous regions of a purified cellulose source material.

In the sense of the invention, the nanocellulose or microcrystalline cellulose (ii) can be unmodified nanocellulose or microcrystalline cellulose, or surface-modified nanocellulose or microcrystalline cellulose.

The nanocellulose can be cellulose nanocrystals (CNC), crystalline nanorods extracted from different plants using an acid-mediated procedure, with a width from 3 to 10 nm and a length from 100 nm to 1 μm, measured by Dynamic Image Analysis (DIA) (according to the general guidelines set out in ISO 13322-2:2006) or Scanning Electron Microscopy (SEM), extracted from different plants using an acid-mediated procedure. Another form of nanocellulose is cellulose nanofibrils (CNF) which are semi-crystalline spaghetti-like nanoparticles with a width from 5 to 30 nm and a length from 1 to 10 μm, measured by Dynamic Image Analysis (DIA) (according to the general guidelines set out in ISO 13322-2:2006) or Scanning Electron Microscopy (SEM). CNF can be manufactured by mild acid hydrolysis coupled with steam explosion, whereas CNC are made by a strong acid like sulfuric acid, which substantially destroys the amorphous portions and leads to the nanocrystal structure. Both CNCs and CNFs can be isolated from plant cell walls.

Microcrystalline cellulose can be extracted from a variety of sources categorized as plants and bacterial origins. Microcrystalline cellulose is purified, partially depolymerized cellulose synthesized by acid-hydrolysis of α-cellulose. The diversity of the different types of microcrystalline cellulose arises from the biosynthesis of the crystalline regions of the α-cellulose, which depends on the raw material source and from the extraction conditions and process. It can be indeed synthesized by different processes such as conventional acid hydrolysis, enzymatic technology, mechanical techniques, ionic method, or combination of two or more of these techniques.

In a preferred embodiment, the nanocellulose or microcrystalline cellulose (ii) is microcrystalline cellulose.

The nanocellulose or microcrystalline cellulose (ii) gives specific properties to the polymeric shell of the microcapsules, such as mechanical properties, biodegradability, and hydrophilicity. In particular, the nanocellulose or microcrystalline cellulose (ii) has desirable properties in the context of the invention, such as nanoscale dimension, high surface area, high specific strength and modulus.

In an embodiment, the nanocellulose or microcrystalline cellulose (ii) can be surface modified such as to increase its hydrophobicity, e.g. through the physical adsorption of molecules such as surfactants or through chemisorption (chemical reaction with a molecule or polymer).

In an embodiment, the nanocellulose or microcrystalline cellulose (ii) may be coated with a wax, and preferably a rice wax. In a preferred embodiment, the coating may consist of a mixture of ORYZA SATIVA BRAN CERA/ORYZA SATIVA (RICE) BRAN WAX.

The nanocellulose or microcrystalline cellulose (ii) useful to form the shell of the microcapsules may be in the form of fibrils having preferably a width ranging from 3 to 30 nm and a length ranging from 100 nm to 10 µm, measured by Dynamic Image Analysis (DIA) (according to the general guidelines set out in ISO 13322-2:2006) or Scanning Electron Microscopy (SEM).

In a preferred embodiment, the nanocellulose or microcrystalline cellulose (ii) is in the form of powder. In one embodiment, the nanocellulose or microcrystalline cellulose (ii) is in the form of fibrils having a median volume diameter (D(v; 0.5)) ranging from 150 nm to 15 µm, preferably from 150 nm to 12 µm, and more preferably from 150 nm to 8 µm. The median volume diameter (D(v; 0.5)) is measured by Static Light Scattering (SLS)/Laser Diffraction Particle Size Distribution Analysis (according to the general guidelines set out in ISO 13320:2020) or Static Light Scattering (SLS) combined with Dynamic Image Analysis (DIA) or Dynamic Image Analysis (DIA).

In one embodiment, the nanocellulose or microcrystalline cellulose (ii) has a water or oil absorption ranging from 1 to 10 g water or oil/g, and preferably from 2 to 8 g water or oil/g.

In one embodiment, the nanocellulose or microcrystalline cellulose (ii) is dispersible in a solvent or a fragrance with a Log P (also named Log Kow, for example in the KOWWIN™ program) of at least 1.5. In the sense of the invention, a nanocellulose or microcrystalline cellulose is dispersible in a solvent or a fragrance with a Log P of at least 1.5 when 10 g of nanocellulose or microcrystalline cellulose is added to 100 g of a solvent or a fragrance with a Log P of at least 1.5, such as 2-phenylethyl alcohol (Log P=1.57) (Sigma-Aldrich), in a 120 mL clear glass bottle, stirred with a spatula for one minute, and that the nanocellulose or microcrystalline cellulose remains homogeneously dispersed in such solvent or fragrance for at least 60 minutes (no creaming or sedimentation noted by visual observation). The homogeneous dispersion of the nanocellulose or microcrystalline cellulose is confirmed by the absence of objects larger than 20 µm observed by optical microscopy (for example with an Eclipse Ci-L Upright Microscope from Nikon Instruments), observations preferably made on at least five different samples of the dispersion. Solvents or fragrance compounds with a Log P of at least 1.5, other than 2-phenylethyl alcohol, that can be used for this dispersibility test are anisyl formate (Log P=1.61), benzyl formate (Log P=1.53), benzaldehyde (Log P=1.71), ethyl isobutyrate (Log P=1.77), cis-3-hexenol (Log P=1.61), linalool oxide (Log P=2.08), eugenol (Log P=2.73), diethyl adipate (Log P=2.37). When the fragrance is a mixture of at least two fragrance compounds, the Log P corresponds to the weighted average of Log P values of each of the fragrance compounds constituting said fragrance.

Water solubility of non-ionic organic molecules can be related to the Log P parameter. Log P refers to the octanol/water partitioning coefficient of fragrance compounds. The octanol/water partitioning coefficient of a fragrance is the ratio between its equilibrium concentrations in octanol and in water. The partitioning coefficients of fragrance compounds are more conveniently given in the form of their logarithm to the base 10, Log P. The Log P values of many fragrance compounds have been reported; for example, the Thor database, available from Daylight Chemical Information Systems, Inc. (Daylight CIS), Irvine, Calif. or Biobyte Corp., contains many, along with citations to the original literature. The Log P is calculated using an atom and fragment calculation approach of Meylan W. M. and Howard P. H. described in "Atom/Fragment Contribution Method for Estimating Octanol Water Partition Coefficients" (1995), Journal of Pharmaceutical Sciences, 84: 83-92, incorporated herein by reference. The fragment approach is based on the chemical structure of each fragrance compounds, and takes into account the numbers and types of atoms, the atom connectivity, and chemical bonding. The calculated Log P values are preferably used instead of the experimental partition coefficient values due to variation in measured values and measurement methods. There are several alternative methods of calculating or estimating Log P values which can show some variation in values. Even calculations within a given set of software may change over time as the algorithms are modified to give results which are closer to measured values. To remove any uncertainty the Log P values reported herein are most conveniently calculated by the KOWWIN™ program, version 1.67, available from the EPI Suite™ Estimation Program Interface of the US Environmental Protection Agency.

In one embodiment, the polymeric shell of the microcapsules of the aqueous dispersion of the invention comprises (iii) at least one monoethylenically α,β-unsaturated carbonyl compound and/or poly(alkylene itaconate).

In a preferred embodiment, the monoethylenically α,β-unsaturated carbonyl compound (iii) is selected from methacrylic acid, itaconic acid, 2-hydroxyethyl methacrylate, 2-hydroxyethyl acrylate, methyl methacrylate, ethyl methacrylate, isopropyl methacrylate, isobornyl methacrylate, and mixtures thereof.

In a preferred embodiment, the monoethylenically α,β-unsaturated carbonyl compound (iii) is selected from methacrylic acid, itaconic acid, 2-hydroxyethyl methacrylate, and mixtures thereof.

In a preferred embodiment, the monoethylenically α,β-unsaturated carbonyl compound (iii) is methacrylic acid.

In a preferred embodiment, the poly(alkylene itaconate) (iii) is of formula:

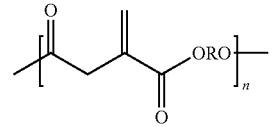

wherein R is $C_1$-$C_6$ alkylene and n varies from 2 to 50.

In one embodiment, the polymeric shell of the microcapsules of the aqueous dispersion of the invention comprises (iv) at least one monofunctional and/or multifunctional thiol compound. In a preferred embodiment, the thiol compound (iv) is a multifunctional thiol compound.

The monofunctional thiol compound (iv) useful to form the shell of the microcapsules is any suitable compounds comprising a single of pendant or terminally positioned thiol group, i.e. SH. The monofunctional thiol compound therefore has only one thiol group per compound. The monofunctional thiol compound (iv) may be a linear or branched aliphatic thiol or aromatic thiol, or a thio-functionalized aliphatic or aromatic heterocycle. The monofunctional thiol compound (iv) may include other groups such as aliphatic, aromatic, alcohol, acid, ester, polyester, ether, or polyether groups, in addition to the thiol group. Preferably, the monofunctional thiol compound (iv) may be a linear or branched aliphatic thiol or a thiophenol.

In a preferred embodiment, the monofunctional thiol compound (iv) is selected from 1-octanethiol, 1-decanethiol, 1-dodecanethiol, tert-octanethiol, tert-dodecanethiol, thioglycolic acid, and mixtures thereof.

The multifunctional thiol compound (iv) useful to form the shell of the microcapsules is any suitable compounds comprising a plurality of pendant or terminally positioned thiol groups, i.e. SH. The multifunctional thiol compound can be a di-functional thiol (with two thiol groups per compound), a tri-functional thiol (with three thiol groups per compound), a tetra-functional thiol (with four thiol groups per compound), a penta-functional thiol (with five thiol groups per compound), a hexa-functional thiol (with six thiol groups per compound), or a higher functionalized thiol compound (with more than six thiol groups per compound). The multifunctional thiol compound (iv) may be a linear or branched aliphatic thiol or aromatic thiol, or a thio-functionalized aliphatic or aromatic heterocycle. Preferably, the multifunctional thiol compound (iv) has as low as possible a fraction of disulfide linkages, and more preferably is free of disulfide linkages. The thiol groups in the multifunctional thiol compound (iv) may be separated from one another in a given molecule by an aliphatic group, an aromatic group, ester, polyester, ether, or polyether groups.

Multifunctional thiol compounds (iv) useful to form the shell of the microcapsules of the aqueous dispersion of the invention may be ethylene glycol bismercaptoacetate, glycol dimercaptoacetate, 1,8-dimercapto-3,6-dioxaoctane, dimercaptodiethyl sulfide, 1,6-hexanedithiol, propane-1,2,3-trithiol, 1,2-bis[(2-mercaptoethyl)thio]-3-mercaptopropane, tetrakis(7-mercapto-2,5-dithiaheptyl)methane, trimethylolpropane tris(2-mercaptoacetate), pentaerythritol tetrakis(2-mercaptoacetate), ethylene glycol bis(3-mercaptopropionate), dipentaerythritol hexakis(3-mercaptopropionate), 1,4-butanediol bis(3-mercaptopropionate), polycaprolactone tetra(3-mercaptopropionate), tris[2-(3-mercaptopropionyloxy)ethyl]isocyanurate, tetraethylene glycol bis(3-mercaptopropionate), ethoxylated trimethylolpropane tri(3-mercapto-propionate), trimethylolethane trimercaptoacetate, 1,4-butanediol bismercaptoacetate, trithiocyanuric acid, pentaerythritol tetrakis(3-mercaptopropionate), trimethylolpropane tris(3-mercaptopropionate), trimethylolpropane tris(3-mercaptobutyrate), 1,4-butanediol bis(3-mercaptobutyrate), poly-2-mercaptoacetate, benzene-1,2-dithiol, 1,4-butanedithiol, 4,4'-biphenyldithiol, benzene-1,4-dithiol, toluene-3,4-dithiol, 1,4-dithiothreitol, 1,3,4-thiadiazole-2,5-dithiol, 1,3,5-benzenetrithiol, 4,4'-bis(mercaptomethylbiphenyl), 1,3,5-tris(3-mercaptobutyryloxyethyl)-1,3,5-triazine-2,4,6(1H,3H,5H)-trione, 3,7-dithia-1,9-nonanedithiol, and mixtures thereof, which are all commercially available or synthesizable by methods known in the art.

In an embodiment, the multifunctional thiol compound (iv) is selected from ethylene glycol bismercaptoacetate, glycol dimercaptoacetate, ethylene glycol bis(3-mercaptopropionate), trimethylolpropane tris(3-mercaptopropionate), pentaerythritol tetrakis(3-mercaptopropionate), and mixtures thereof.

In a preferred embodiment, the multifunctional thiol compound (iv) is selected from ethylene glycol bismercaptoacetate, glycol dimercaptoacetate, trimethylolpropane tris(3-mercaptopropionate), pentaerythritol tetrakis(3-mercaptopropionate), and mixtures thereof.

In a preferred embodiment, the multifunctional thiol compound (iv) is selected from ethylene glycol bismercaptoacetate, glycol dimercaptoacetate, trimethylolpropane tris(3-mercaptopropionate), and mixtures thereof.

In an embodiment, the weight ratio between the monofunctional and/or multifunctional thiol compound (iv) and the multifunctional α,β-unsaturated carbonyl compound(s) (i) ranges from 0 to 0.5, preferably from 0 to 0.3, more preferably from 0 to 0.25, and even more preferably from 0.01 to 0.25.

In an embodiment, the weight ratio between the monofunctional and/or multifunctional thiol compound (iv) and the nanocellulose or microcrystalline cellulose (ii) ranges from 0 to 0.3, preferably from 0 to 0.2, and more preferably from 0.001 to 0.1.

In one embodiment, the aqueous dispersion of microcapsules of the invention comprises solid colloidal inorganic particles.

The solid colloidal inorganic particles (also known as particulate colloids) may have an average particle size comprised between 5 nm and 6 μm, measured by Dynamic Light Scattering (DLS).

Suitable solid colloidal inorganic particles include particles of silica, quartz, glass, aluminium hydroxide oxide (AlO(OH)), lithium magnesium sodium silicates, aluminosilicates (e.g. clays), silicon, copper, tin(II) oxide (SnO), talc, inorganic oxides or hydroxides (e.g. $Fe_2O_3$, $TiO_2$, $Cr_2O_3$), steel, iron, asbestos, nickel, zinc, lead, marble, chalk ($CaCO_3$), gypsum (CaSO4), barytes (e.g. BaSO4), graphite, carbon black. In one embodiment, the solid colloidal inorganic particles are selected from particles of silica or particles of lithium magnesium sodium silicates. In a preferred embodiment, the solid colloidal inorganic particles are silica particles.

Solid colloidal inorganic particles may or may not be surface modified. Examples of surface modification include chemical treatments to increase or decrease particles hydrophobicity. Alternatively, surface modifying agents can be adsorbed onto particles surface to impart appropriate surface active properties. Alternatively, particles may be modified by means of coupling agents which improve the compatibility between the particles and the microcapsule shell. Techniques to modify particle surfaces are discussed for example in "Nanoparticle Technology handbook" 1$^{st}$ edition, year 2007, Application 41 (pages 593-596) "Surface modification of inorganic nanoparticles by organic functional groups". Modified (as well as non-modified) solid colloidal inorganic particles are commercially available.

Examples of suitable colloidal silicas may be dry fumed silicas (such as the range of products marketed under the tradename Aerosil®) or aqueous colloidal silica dispersions (such as the range of products marketed under the tradename Ludox®). Dry silica particles may be fumed silica particles or condensed silica particles. Fumed silicas are particularly adapted for stabilizing emulsions with droplet sizes in the range of 10 μm to 100 μm. For larger droplets, colloidal silicas might be more appropriate. Suitable grades of fumed silica are Aerosil® 200 (a hydrophilic fumed silica with a specific surface area of 200 $m^2 \cdot g^{-1}$) and Aerosil® R816 having a BET surface area of 190±20 $m^2 \cdot g^{-1}$ and an average particle size of about 12 nm, both available from Evonik. Aerosil® R816 silica is treated with hexadecyltrimethoxysilane.

The use of solid colloidal inorganic particles as presently defined has been found to allow satisfactory and effective microencapsulation of desirably high fragrance loadings while maintaining a suitable quality of the resulting dispersion (e.g., good processability of the dispersion).

In a preferred embodiment, the solid colloidal inorganic particles are typically added in an amount ranging from 0.05 to 1% by weight, preferably from 0.08 to 0.8% by weight, and more preferably from 0.09 to 0.5% by weight, relative to the weight of the aqueous dispersion.

In one embodiment, the polymeric shell comprises (v) at least one silyl (meth)acrylate compound.

In a preferred embodiment, the silyl (meth)acrylate compound (v) is selected from trimethylsilyl (meth)acrylate, triethylsilyl (meth)acrylate, tripropylsilyl (meth)acrylate, triisopropylsilyl (meth)acrylate, tributylsilyl (meth)acrylate, tri-sec-butylsilyl (meth)acrylate, triisobutylsilyl (meth)acrylate, sec-butylmethylsilyl (meth)acrylate, sec-butyldimethylsilyl (meth)acrylate, dimethylpropylsilyl (meth)acrylate, monomethyldipropylsilyl (meth)acrylate, and methylethylpropylsilyl (meth)acrylate, 3-(trimethoxysilyl)propyl (meth)acrylate, 3-(triethoxysilyl)propyl (meth)acrylate, 3-(trichlorosilyl)propyl (meth)acrylate, and mixtures thereof, and preferably 3-(trimethoxysilyl)propyl methacrylate, 3-(triethoxysilyl)propyl methacrylate, and mixtures thereof.

In one embodiment, in conjunction with solid colloidal inorganic particles, silane coupling agents may be used to increase the compatibility between the polymer formed and the solid colloidal inorganic particles. These silane coupling agents may be (3-mercaptopropyl)trimethoxysi lane, (3-mercaptopropyl)ethoxysilane, 3-acrylamidopropyltrimethoxysilane, acryloxymethyltrimethoxysilane, (3-acryloxypropyl)trimethoxysilane, (3-acryloxypropyl)methyldiethoxysilane, 3-acryloxypropyl)methyldimethoxysi lane, o-(methacryloxyethyl)-N-(triethoxysilylpropyl)carba mate, methacryloxypropyltrimethoxysilane, methacryloxypropyltriethoxysi lane, o-(methacryloxyethyl)-N-(triethoxysilylpropyl)urethane, methacryloxymethyltri methoxysilane, (methacryloxymethyl)methyl diethoxysilane, (methacryloxymethyl)methyl dimethoxysilane, and mixtures of thereof.

In a preferred embodiment, the silane coupling agent is selected from (3-mercaptopropyl)trimethoxysilane, (3-mercaptopropyl)ethoxysilane, (3-acryloxypropyl)trimethoxysilane, methacryloxypropyltrimethoxysilane, and mixtures thereof.

In an embodiment, the silane coupling agent is present in an amount ranging from 50 and 300% by weight, and preferably from 100 to 200% by weight, relative to the total weight of solid colloidal inorganic particles.

In an embodiment, the amount of multifunctional α,β-unsaturated carbonyl compound(s) (i) ranges from 8 to 65% by weight, preferably from 8 to 50%, and more preferably from 8 to 40% by weight, relative to the total weight of compounds (i), (ii), (iii), (iv) and (v).

In an embodiment, the amount of nanocellulose or microcrystalline cellulose (ii) ranges from 30 to 90% by weight, preferably from 40 to 90% by weight, and more preferably from 50 to 90% by weight, relative to the total weight of compounds (i), (ii), (iii), (iv) and (v).

In an embodiment, the weight ratio between the multifunctional α,β-unsaturated carbonyl compound(s) (i) and the nanocellulose or microcrystalline cellulose (ii) ranges from 0.1 to 1, preferably from 0.1 to 0.9, more preferably from 0.1 to 0.8, and even more preferably from 0.1 to 0.7. In a preferred embodiment, the weight ratio between the multifunctional α,β-unsaturated carbonyl compound(s) (i) and the nanocellulose or microcrystalline cellulose (ii) ranges from 0.1 to 0.6, preferably from 0.1 to 0.55, and more preferably from 0.15 to 0.5.

In an embodiment, the amount of monoethylenically α,β-unsaturated carbonyl compound(s) and/or poly(alkylene itaconate) (iii) ranges from 0 to 30% by weight, preferably from 0.1 to 25% by weight, and more preferably from 0.5 to 20% by weight, relative to the total weight of compounds (i), (ii), (iii), (iv) and (v).

In an embodiment, the amount of monofunctional and/or multifunctional thiol compound(s) (iv) ranges from 0 to 20% by weight, preferably from 0.1 to 15% by weight, and more preferably from 0.5 to 7% by weight, relative to the total weight of compounds (i), (ii), (iii), (iv) and (v).

In an embodiment, the amount of silyl acrylate compound(s) (v) ranges from 0 to 20% by weight, preferably from 0.1 to 10% by weight, and more preferably from 0.5 to 7% by weight, relative to the total weight of solid colloidal inorganic particles.

In an embodiment, the weight ratio between the silyl acrylate compound(s) (v) and the solid colloidal inorganic particles ranges from 0.5 to 3, preferably from 0.6 to 2.5, and more preferably from 0.8 to 2.

The dispersion may comprise, for example essentially consists of, a water-based liquid medium (i.e. the dispersing medium) and a plurality of microcapsules dispersed in the medium. Traces of other ingredients used in the manufacturing process (such as unreacted monomers) may also be present.

In one embodiment, the water-based liquid medium comprises, for example essentially consists of, water, such as deionized water.

In one embodiment, the water-based liquid medium comprises at least one thickener (also called thickening polymer) used to limit the creaming and/or sedimentation of the microcapsules in the aqueous phase. Examples of thickeners are xanthan gum, acacia gum, guar gum, locust bean gum, sclerotium gum, scleroglucan, tara gum, cellulose gum, hydroxypropylcellulose (HPC), carrageenan, ceratonia siliqua gum, copolymer of ammonium acryloyldimethyltaurate, dimethylacrylamide, lauryl methacrylate and laureth-4 polymethacrylate crosslinked with trimethylolpropane triacrylate, copolymer of acrylamidopropyltrimonium chloride and acrylamide, poly(2-methacryloylethyl trimethylammonium chloride), and mixtures thereof. Preferred thickeners are xanthan gum, acacia gum, cellulose gum, copolymer of ammonium acryloyldimethyltaurate, dimethylacrylamide, lauryl methacrylate and laureth-4 methacrylate crosslinked with trimethylolpropane triacrylate, and mixtures thereof. Thickener(s) are used in a preferred range from 0.05 to 0.6%, and more preferably from 0.1 to 0.5%, by weight relative to the total weight of the aqueous dispersion.

Optionally, surfactant(s) can be added to the water-based liquid medium after the formation of the microcapsules for an easier dispersion of the thickener(s). They can be added before or after the thickener(s). Examples of surfactants are non-ionic esters of fatty acids such as polyol esters of fatty acids and fatty acid esters of sugars. Preferred ones are the ester of isostearic acid or oleic acid combined with polyethylene glycol, glycerin and/or ethoxylated sorbitan, and mixtures thereof. Surfactant(s) are used in a preferred range from 0.5 to 3%, and more preferably from 1 to 2%, by weight relative to the total weight of the aqueous dispersion.

In one embodiment, the hydrophobic core of the microcapsules comprises such as essentially consists of, such as consists of, a fragrance, which in that case typically represents from 20% to 45%, such as at least 25%, for example at least 30% or at least 33%, and such as no more than 40%, for example no more than 35%, by weight relative to the total weight of the aqueous dispersion.

In one embodiment, the microcapsules as presently disclosed have a shell thickness from about 80 nm to about 800 nm, such as from about 150 nm to about 700 nm, for example from about 180 nm to about 500 nm, when dried and opened and observed with a Scanning Electron Microscope (SEM).

In one embodiment, the microcapsules presently disclosed are substantially spherical.

In one embodiment, the microcapsules presently disclosed have a median volume diameter (D(v; 0.5)) equal to or greater than 8 µm, for example equal to or greater than 10 µm, such as equal to or greater than 15 µm. In a further embodiment, the microcapsules presently disclosed have a median volume diameter equal to or less than 100 µm, or equal to or less than 65 µm, for example equal to or less than 50 µm, such as equal to or less than 45 µm, for example equal to or less than 40 µm. In a further embodiment, the microcapsules presently disclosed have a median volume diameter from 8 µm to 100 µm, or from 8 µm to 65 µm, or from 8 µm to 50 µm, or from 10 µm to 50 µm, or from 8 µm to 45 µm, or from 10 µm to 45 µm, or from 15 µm to 45 µm, or from 15 µm to 40 µm.

The microcapsule median volume diameter is measured by Static Light Scattering (SLS) using for example a Horiba® or a Malvern® Laser Diffraction Particle Size Distribution Analyzer or an equivalent instrument working on the principle of Low Angle Laser Light Scattering (LALLS) following the general guidelines set out in ISO 13320:2020 "Particle Size Analysis—Laser Diffraction Methods".

The hydrophobic core of the microcapsules advantageously comprises a hydrophobic material, such as a fragrance. A fragrance comprises at least one, and preferably a mixture of two or more olfactively active (i.e. odoriferous) compounds (also named "fragrance compounds") typically but not necessarily providing a pleasant smell. The fragrance thus typically comprises at least one, such as at least two, such as at least five, or at least eight distinct fragrance compounds. It can comprise highly complex mixtures of fragrance compounds, chosen to provide any desired odour. In the context of the present invention the term "fragrance" is intended to be synonymous with "perfume". The fragrance of the invention preferably excludes edible compounds. In other words, the fragrance of the invention is advantageously a non-edible compound, which means a compound non-intended for ingestion by humans or animals. Fragrance compounds typically used in the field of perfumery and suitable for the purposes of the present invention are described more fully in S. Arctander, Perfume Flavors and Chemicals 1969, Vols. I and II, Montclair, N.J. and in The Merck Index, 8$^{th}$ edition, Merck & Co., Inc. Rahway, N.J. The term "fragrance compound" encompasses naturally occurring as well as synthetic materials known for use in perfumes, as well as animal oils. A fragrance compound can also be any natural oil or extract used in a fragrance composition. Natural oils and extracts are described in The Essential Oils by E. Guenther published in 1949 by D. Van Nostrand Company, and may include extracts, pressings, collection of exudates, and distillates from any part of suitable plants: roots, rhizomes, bulbs, corms, stem, bark, heartwood, leaves, flowers, seeds and fruit. Examples of such extracts and distillates include citrus fruit oils such as orange, mandarin, grapefruit, lime or lemon oils, tree oils such as pine, or cedar wood, herb oils such as peppermint, thyme, lavender, basil, rosemary, clove or flower extracts such as rose, jasmine, muguet, or geranium oil.

In one embodiment, the fragrance has a Log P of at least 1.5. Advantageously, the fragrance has a Log P ranging from 1.5 to 6. In the context of the invention, the Log P of the fragrance corresponds to the weighted average of Log P values of each of the fragrance compounds constituting the fragrance.

In one embodiment, each fragrance compound has a molecular weight greater than 100 g·mol$^{-1}$, preferably greater than 120 g·mol$^{-1}$ and lower than 325 g·mol$^{-1}$, preferably lower than 300 g·mol$^{-1}$. In a further embodiment each fragrance compound has a boiling point in the range 80-400° C., such as in the range 100-350° C., when measured at 760 mm Hg.

In a preferred embodiment, the fragrance compounds can advantageously be selected from the following list:

$C_8$-$C_{18}$ hydrocarbons, preferably delta-3-carene, alpha-pinene, beta-pinene, alpha-terpinene, gamma-terpinene, p-cymene, bisabolene, camphene, caryophyllene, cedrene, farnesene, limonene, longifolene, myrcene, ocimene, valencene, (E,Z)-1,3,5-undecatriene;

$C_2$-$C_{18}$ aliphatic alcohols, preferably hexanol, octanol, 3-octanol, 2,6-dimethylheptanol, 2-methylheptanol, 2-methyloctanol, (E)-3-hexenol, (E)- and (Z)-3-hexenol, 1-octen-3-ol, mixtures of 3,4,5,6,6-pentamethyl-3/4-hepten-2-ol and 3,5,6,6-tetramethyl-4-methyleneheptan-2-ol, (E,Z)-2,6-nonadienol, 3,7-dimethyl-7-methoxyoctan-2-ol, 9-decenol, 10-undecenol, 4-methyl-3-decen-5-ol;

$C_2$-$C_{18}$ aliphatic aldehydes and their acetals, preferably hexanal, heptanal, octanal, nonanal, decanal, undecanal, dodecanal, tridecanal, 2-methyloctanal, 2-methylnonanal, (E)-2-hexenal, (Z)-4-heptenal, 2,6-dimethyl-5-heptenal, 10-undecenal, (E)-4-decenal, 2-dodecenal, 2,6,10-trimethyl-5,9-undecadienal, heptanal diethyl acetal, 1,1-dimethoxy-2,2,5-trimethyl-4-hexene, citronellyl oxyacetaldehyde;

$C_3$-$C_{18}$ aliphatic ketones and oximes thereof, preferably 2-heptanone, 2-octanone, 3-octanone, 2-nonanone, 5-methyl-3-heptanone, 5-methyl-3-heptanone oxime, 2,4,4,7-tetramethyl-6-octen-3-one;

$C_2$-$C_{18}$ aliphatic sulphur-containing compounds, preferably 3-methylthiohexanol, 3-methylthiohexyl acetate, 3-mercaptohexanol, 3-mercaptohexyl acetate, 3-mercaptohexyl butyrate, 3-acetylthiohexyl acetate, 1-menthene-8-thiol;

$C_2$-$C_{18}$ aliphatic nitrile-containing compounds, preferably 2-nonenenitrile, 2-tridecenenenitrile, 2,12-tridecenenenitrile, 3,7-dimethyl-2,6-octadienenitrile, 3,7-dimethyl-6-octenenitrile;

$C_2$-$C_{18}$ aliphatic carboxylic acids and esters thereof, preferably (E)- and (Z)-3-hexenyl formate, ethyl acetoacetate, isoamyl acetate, hexyl acetate, 3,5,5-trimethylhexyl acetate, 3-methyl-2-butenyl acetate, (E)-2-hexenyl acetate, (E)- and (Z)-3-hexenyl acetate, octyl acetate, 3-octyl acetate, 1-octen-3-yl acetate, ethyl butyrate, butyl butyrate, isoamyl butyrate, hexyl butyrate, (E)- and (Z)-3-hexenyl isobutyrate, hexyl crotonate, ethyl isovalerate, ethyl 2-methylpentanoate, ethyl hexanoate, allyl hexanoate, ethyl heptanoate, allyl heptanoate, ethyl octanoate, ethyl (E,Z)-2,4-decadienoate, methyl 2-octynoate, methyl 2-nonynoate, allyl-2-isoamyloxyacetate, methyl-3,7-dimethyl-2,6-octadienoate;

$C_4$-$C_{18}$ acyclic terpene alcohols, preferably citronellol, geraniol, nerol, linalool, lavandulol, nerolidol, farnesol, tetrahydrolinalool, tetrahydrogeraniol, 2,6-dimethyl-7-octen-2-ol, 2,6-dimethyloctan-2-ol, 2-methyl-6-methylene-7-octen-2-ol, 2,6-dimethyl-5,7-octadien-2-ol, 2,6-dimethyl-3,5-octadien-2-ol, 3,7-dimethyl-4,6-octadien-3-ol, 3,7-dimethyl-1,5,7-octatrien-3-ol, 2,6-dimethyl-2,5,7-octatrien-1-ol;

$C_4$-$C_{18}$ acyclic terpene aldehydes and ketones, preferably geranial, neral, citronellal, 7-hydroxy-3,7-dimethyloctanal, 7-methoxy-3,7-dimethyloctanal, 2,6,10trimethyl-9-undecenal, geranylacetone, and the dimethyl and diethyl acetals of geranial, neral, 7-hydroxy-3,7-dimethyloctanal;

$C_4$-$C_{18}$ cyclic terpene alcohols, preferably alpha-terpineol, terpineol-4, menthan-8-ol, menthan-1-ol, menthan-7-ol, borneol, isoborneol, linalool oxide, nopol, cedrol, ambrinol, vetiverol, guaiol;

$C_4$-$C_{18}$ cyclic terpene aldehydes and ketones, preferably fenchone, alpha-ionone, beta-ionone, alpha-n-methylionone, beta-n-methylionone, alpha-isomethylionone, beta-isomethylionone, alpha-irone, alpha-damascone, beta-damascone, beta-damascenone, delta-damascone, gamma-damascone, 1-(2,4,4-trimethyl-2-cyclohexen-1-yl)-2-buten-1-one, 1,3,4,6,7,8a-hexahydro-1,1,5,5-tetramethyl-2H-2,4a-methanonaphthalen-8(5H)-one, nootkatone, dihydronootkatone, alpha-sinensal, beta-sinensal, methyl cedryl ketone;

$C_4$-$C_{18}$ cyclic alcohols, preferably 4-tert-butylcyclohexanol, 3,3,5-trimethylcyclohexanol, 3-isocamphylcyclohexanol, 2,6,9-trimethyl-Z2,Z5,E9-cyclododecatrien-1-ol, 2-isobutyl-4-methyltetrahydro-2H-pyran-4-ol;

$C_4$-$C_{18}$ cycloaliphatic alcohols, preferably alpha-3,3-trimethylcyclohexylmethanol, 2-methyl-4-(2,2,3-trimethyl-3-cyclopent-1-yl)butanol, 2-methyl-4-(2,2,3-trimethyl-3-cyclopent-1-yl)-2-buten-1-ol, 2-ethyl-4-(2,2,3-trimethyl-3-cyclopent-1-yl)-2-buten-1-ol, 3-methyl-5-(2,2,3-trimethyl-3-cyclopent-1-yl)-pentan-2-ol, 3-methyl-5-(2,2,3-trimethyl-3-cyclopent-1-yl)-4-penten-2-ol, 3,3-dimethyl-5-(2,2,3-trimethyl-3-cyclopent-1-yl)-4-penten-2-ol, 1-(2,2,6-trimethylcyclohexyl)pentan-3-ol, 1-(2,2,6-trimethylcyclohexyl)hexan-3-ol;

$C_4$-$C_{18}$ cyclic and cycloaliphatic ethers, preferably cedryl methyl ether, cyclododecyl methyl ether, (ethoxymethoxy)cyclododecane, alpha-cedrene epoxide, 3a,6,6,9a-tetramethyl-dodecahydronaphtho[2,1-b]furan, 3a-ethyl-6,6,9a-trimethyldodecahydro-naphtho[2,1-b]furan, 1,5,9-trimethyl-13-oxabicyclo[10.1.0]trideca-4,8-diene, rose oxide, 2-(2,4-dimethyl-3-cyclohexen-1-yl)-5-methyl-5-(1-methylpropyl)-1,3-dioxane;

$C_4$-$C_{18}$ cyclic ketones, preferably 4-tert-butylcyclohexanone, 2,2,5-trimethyl-5-pentylcyclopentanone, 2-heptylcyclopentanone, 2-pentylcyclopentanone, 2-hydroxy-3-methyl-2-cyclopenten-1-one, 3-methyl-cis-2-penten-1-yl-2-cyclopenten-1-one, 3-methyl-2-pentyl-2-cyclopenten-1-one, 3-methyl-4-cyclopentadecenone, 3-methyl-5-cyclopentadecenone,3-methylcyclopentadecanone, 4-(1-ethoxyvinyl)-3,3,5,5-tetramethylcyclohexanone, 4-tert-pentylcyclohexanone, 5-cyclohexadecen-1-one, 6,7-dihydro-1,1,2,3,3-pentamethyl-4(5H)-indanone, 9-cycloheptadecen-1-one, cyclopentadecanone, cyclohexadecanone;

$C_4$-$C_{18}$ cycloaliphatic aldehydes, preferably 2,4-dimethyl-3-cyclohexenecarbaldehyde, 2-methyl-4-(2,2,6-trimethyl-cyclohexen-1-yl)-2-butenal, 4-(4-hydroxy-4-methylpentyl)-3-cyclohexenecarbaldehyde, 4-(4-methyl-3-penten-1-yl)-3-cyclohexenecarbaldehyde;

$C_4$-$C_{18}$ cycloaliphatic ketones, preferably 1-(3,3-dimethylcyclohexyl)-4-penten-1-one, 1-(5,5-dimethyl-1-cyclohexen-1-yl)-4-penten-1-one, 2,3,8,8-tetramethyl-1,2,3,4,5,6,7,8-octahydro-2-naphthalenyl methyl ketone, methyl-2,6,10-trimethyl-2,5,9-cyclododecatrienyl ketone, tert-butyl(2,4-dimethyl-3-cyclohexen-1-yl)ketone;

esters of cyclic alcohols in $C_4$-$C_{18}$, preferably 2-tert-butylcyclohexyl acetate, 4-tert-butyl-cyclohexyl acetate, 2-tert-pentylcyclohexyl acetate, 4-tert-pentylcyclohexyl acetate, decahydro-2-naphthyl acetate, 3-pentyltetrahydro-2H-pyran-4-yl acetate, decahydro-2,5,5,8a-tetramethyl-2-naphthyl acetate, 4,7-methano-3a,4,5,6,7,7a-hexahydro-5 or 6-indenyl acetate, 4,7-methano-3a,4,5,6,7,7a-hexahydro-5 or 6-indenyl propionate, 4,7-methano-3a,4,5,6,7,7a-hexahydro-5 or 6-indenyl isobutyrate, 4,7-methanooctahydro-5 or 6-indenyl acetate;

esters of cycloaliphatic carboxylic acids in $C_4$-$C_{18}$, preferably allyl 3-cyclohexylpropionate, allyl cyclohexyloxyacetate, methyl dihydrojasmonate, methyl jasmonate, methyl 2-hexyl-3-oxocyclopentanecarboxylate, ethyl 2-ethyl-6,6-dimethyl-2-cyclohexenecarboxylate, ethyl 2,3,6,6-tetramethyl-2-cyclohexenecarboxylate, ethyl 2-methyl-1,3-dioxolane-2-acetate;

$C_4$-$C_{18}$ aromatic hydrocarbons, preferably styrene and diphenylmethane;

$C_4$-$C_{18}$ araliphatic alcohols, preferably benzyl alcohol, 1-phenylethyl alcohol, 2-phenylethyl alcohol, 3-phenylpropanol, 2-phenylpropanol, 2-phenoxyethanol, 2,2-dimethyl-3-phenylpropanol, 2,2-dimethyl-3-(3-methylphenyl)propanol, 1,1-dimethyl-2-phenylethyl alcohol, 1,1-dimethyl-3-phenylpropanol, 1-ethyl-1-methyl-3-phenylpropanol, 2-methyl-5-phenylpentanol, 3-methyl-5-phenylpentanol, 3-phenyl-2-propen-1-ol, 4-methoxybenzyl alcohol, 1-(4-isopropylphenyl)ethanol;

esters of araliphatic alcohols in $C_4$-$C_{18}$ and aliphatic carboxylic acids in $C_4$-$C_{18}$, preferably benzyl acetate, benzyl propionate, benzyl isobutyrate, benzyl isovalerate, 2-phenylethyl acetate, 2-phenylethyl propionate, 2-phenylethyl isobutyrate, 2-phenylethyl isovalerate, 1-phenylethyl acetate, α-trichloromethylbenzyl acetate, α,α-dimethylphenylethyl acetate, α,α-dimethylphenylethyl butyrate, cinnamyl acetate, 2-phenoxyethyl isobutyrate, 4-methoxybenzyl acetate;

$C_2$-$C_{18}$ araliphatic ethers, preferably 2-phenylethyl methyl ether, 2-phenylethyl isoamyl ether, 2-phenylethyl 1-ethoxyethyl ether, phenylacetaldehyde dimethyl acetal, phenylacetaldehyde diethyl acetal, hydratropaldehyde dimethyl acetal, phenylacetaldehyde glycerol acetal, 2,4,6-trimethyl-4-phenyl-1,3-dioxane, 4,4a,5,9b-tetrahydroindeno[1,2-d]-m-dioxin, 4,4a,5,9b-tetrahydro-2,4-dimethylindeno[1,2-d]-m-dioxin;

$C_4$-$C_{18}$ aromatic and araliphatic aldehydes, preferably benzaldehyde, phenylacetaldehyde, 3-phenylpropanal, hydratropaldehyde, 4-methylbenzaldehyde, 4-methylphenylacetaldehyde, 3-(4-ethylphenyl)-2,2-dimethylpropanal, 2-methyl-3-(4-isopropylphenyl)propanal, 2-methyl-3-(4-tert-butylphenyl)propanal, 3-(4-tert-butylphenyl)propanal, cinnamaldehyde, alpha-butylcinnamaldehyde, alpha-amylcinnamaldehyde, alpha-hexylcinnamaldehyde, 3-methyl-5-phenylpentanal, 4-methoxybenzaldehyde, 4-hydroxy-3-methoxybenzaldehyde, 4-hydroxy-3-ethoxybenzaldehyde, 3,4-methylenedioxybenzaldehyde, 3,4-dimethoxybenzaldehyde, 2-methyl-3-(4-methoxyphenyl)propanal, 2-methyl-3-(4-methylenedioxyphenyl)propanal;

$C_4$-$C_{18}$ aromatic and araliphatic ketones, preferably acetophenone, 4-methylacetophenone, 4-methoxyacetophenone, 4-tert-butyl-2,6-dimethylacetophenone, 4-phenyl-2-butanone, 4-(4-hydroxyphenyl)-2-butanone, 1-(2-naphthalenyl)ethanone, benzophenone, 1,1,2,3,3,6-hexamethyl-5-indanyl methyl ketone, 6-tert-butyl-1,1-dimethyl-4-indanyl methyl ketone, 1-[2,3-dihydro-1,1,2,6-tetramethyl-3-(1-methylethyl)-1H-5-indenyl]ethanone, 5',6',7',8'-tetrahydro-3',5',5',6',8',8'-hexamethyl-2-acetonaphthone;

$C_4$-$C_{18}$ aromatic and araliphatic carboxylic acids and esters thereof, preferably phenylacetic acid, methyl benzoate, ethyl benzoate, hexyl benzoate, benzyl benzoate, methyl phenylacetate, ethyl phenylacetate, geranyl phenylacetate, phenylethyl phenylacetate, methyl cinnamate, ethyl cinnamate, benzyl cinnamate, phenylethyl cinnamate, cinnamyl cinnamate, allyl phenoxyacetate, methyl salicylate, isoamyl salicylate, hexyl salicylate, cyclohexyl salicylate, cis-3-hexenyl salicylate, benzyl salicylate, phenylethyl salicylate, methyl 2,4-dihydroxy-3,6di-methylbenzoate, ethyl 3-phenylglycidate, ethyl 3-methyl-3-phenylglycidate;

nitrogen-containing aromatic compounds in $C_4$-$C_{18}$, preferably 2,4,6-trinitro-1,3-dimethyl-5-tert-butylbenzene, 3,5-dinitro-2,6-dimethyl-4-tert-butylacetophenone, cinnamonitrile, 5-phenyl-3-methyl-2-pentenenitrile, 5-phenyl-3-methylpentanenitrile, methyl anthranilate, methyl N-methylanthranilate, Schiff bases of methyl anthranilate with 7-hydroxy-3,7-dimethyloctanal, 2-methyl-3-(4-tert-butylphenyl)propanal, 2,4-dimethyl-3-cyclohexene-carbaldehyde, 6-isopropylquinoline, 6-isobutylquinoline, 6-sec-butylquinoline, indole, skatole, 2-methoxy-3-isopropylpyrazine, 2-isobutyl-3-methoxypyrazine;

phenols, phenyl ethers and phenyl esters, preferably estragole, anethole, eugenol, eugenyl methyl ether, isoeugenol, isoeugenyl methyl ether, thymol, carvacrol, diphenyl ether, beta-naphthyl methyl ether, beta-naphthyl ethyl ether, beta-naphthyl isobutyl ether, 1,4-dimethoxybenzene, eugenyl acetate, 2-methoxy-4-methylphenol, 2-ethoxy-5-(1-propenyl)phenol, p-cresyl phenylacetate;

heterocyclic compounds in $C_4$-$C_{12}$, preferably 2,5-dimethyl-4-hydroxy-2H-furan-3-one, 2-ethyl-4-hydroxy-5-methyl-2H-furan-3-one, 3-hydroxy-2-methyl-4H-pyran-4-one, 2-ethyl-3-hydroxy-4H-pyran-4-one;

lactones in $C_4$-$C_{18}$, preferably 1,4-octanolide, 3-methyl-1,4-octanolide, 1,4-nonanolide, 1,4-decanolide, 8-decen-1,4-olide, 1,4-undecanolide, 1,4-dodecanolide, 1,5-decanolide, 1,5-dodecanolide, 1,15-pentadecanolide, cis- and trans-11-pentadecen-1,15-olide, cis- and trans-12-pentadecen-1,15-olide, 1,16-hexadecanolide, 9-hexadecen-1,16-olide, 10-oxa-1,16-hexadecanolide, 11-oxa-1,16-hexadecanolide, 12-oxa-1,16-hexadecanolide, ethylene 1,12-dodecanedioate, ethylene 1,13-tridecanedioate, coumarin, 2,3-dihydrocoumarin, octahydrocoumarin.

In one embodiment, the fragrance compounds present in the fragrance do not contain ionizing functional groups, such as sulfonates, sulphates, phosphates or quaternary ammonium ions.

In one embodiment, the fragrance defined above includes one or more support materials, such as solvents or UV stabilizers. Suitable solvents are advantageously biodegradable, biosourced, and more advantageously of non-animal origin. Examples of suitable solvents include hydrocarbons such as those sold under the trade name Isopar®; ethers such as those sold under the Dowanol® trade name; benzyl benzoate; isopropyl myristate; dialkyl adipates; dialkyl succinates; dialkyl glutarates such as the dimethyl esters sold under the trade name Flexisolv®; citrate esters, such as triethyl citrate and acetyl tributyl citrate; soybean methyl ester such as ME-51885 (sold by Peter Cremer NA); diethyl phthalate; diethylene glycol monoethyl ether; 3-methoxy-3-methyl-1-butanol; dipropylene glycol; isopropylidene glycerol sold under the Augeo® Clean Multi brand name; and methyl ester of hydrogenated rosin. Preferred solvents are benzyl benzoate, isopropyl myristate, dialkyl adipates such as dioctyl adipate, dialkyl succinates, dialkyl glutarates such as the dimethyl esters sold under the trade name Flexisolv®, soybean methyl ester such as ME-S1885 (sold by Peter Cremer NA), and methyl ester of hydrogenated rosin. Isopropyl myristate is the most preferred solvent. Examples of UV stabilizers include butyl methoxy dibenzoyl methane; bis ethylhexyloxyphenolmethoxyphenyl triazine; those sold under the Uvinol® trade name such as Uvinul® D50 [bis (2,4-dihydroxyphenyl)-methanone], Parsol® 1789 (butyl methoxydibenzoylmethane); and those sold under the Tinogard® trade name. In one embodiment, the fragrance comprise up to 60% by weight, such as up to 70% by weight, up to 80% by weight, up to 90% by weight or even 100% by weight of fragrance compounds, the remainder (if appropriate) being made up of support materials as defined above.

In one embodiment, the hydrophobic core of the microcapsules comprises at least 70% by weight, such as at least 80% by weight, or at least 90% by weight of fragrance.

In one embodiment, when the hydrophobic core of the microcapsules as presently disclosed comprise a fragrance, the fragrance to shell weight ratio is from about 50:1 to about 1:1, such as from about 30:1 to about 1:1, or from about 20:1 to about 1:1, for example from about 10:1 to about 1:1.

In a second aspect, the invention relates to a process for the manufacture of an aqueous dispersion as defined above.

The process for the manufacture of an aqueous dispersion according to the invention may comprise the following steps:

a—providing an oil-in-water emulsion having an oil phase and an aqueous phase, wherein the oil phase comprises the constituent(s) of the hydrophobic core, and the oil phase or the aqueous phase comprises at least one multifunctional α,β-unsaturated carbonyl compound (i), at least one nanocellulose or microcrystalline cellulose (ii), optionally at least one monoethylenically α,β-unsaturated carbonyl compound(s) and/or poly(alkylene itaconate) (iii), optionally at least one monofunctional and/or multifunctional thiol compound (iv), optionally at least one silyl acrylate compound (v), optionally a polymeric stabilizer, and optionally solid colloidal inorganic particles, according to whether the compounds (i), (ii), (iii), (iv), (v), polymeric stabilizer, and solid colloidal inorganic particles, are oil-soluble or water-soluble, said oil-in-water emulsion being obtainable by mixing, b—triggering polymerization by free-radical polymerization of the emulsion obtained in step a—, and c—letting the polymerization propagate thereby obtaining microcapsules.

The multifunctional α,β-unsaturated carbonyl compound (i), the nanocellulose or microcrystalline cellulose (ii), the monoethylenically α,β-unsaturated carbonyl compound(s) and/or poly(alkylene itaconate) (iii), the monofunctional and/or multifunctional thiol compound (iv), the silyl acrylate compound (v), the polymeric stabilizer, and the solid colloidal inorganic particles, used in the process of the invention, are as defined above for the aqueous dispersion of microcapsules of the invention.

In a preferred embodiment, the process for the manufacture of an aqueous dispersion of microcapsules according to the invention may comprise a step a—of providing an oil-in-water emulsion the oil phase comprises the constituent(s) of the hydrophobic core, the at least one multifunctional α,β-unsaturated carbonyl compound (i), the at least one nanocellulose or microcrystalline cellulose (ii), optionally the at least one monoethylenically α,β-unsaturated carbonyl compound(s) and/or poly(alkylene itaconate) (iii), optionally the at least one monofunctional and/or multifunctional thiol compound (iv), and optionally the at least one silyl acrylate compound (v), and the aqueous phase comprises optionally the polymeric stabilizer, and optionally the solid colloidal inorganic particles.

In an embodiment, the oil phase of the oil-in-water emulsion comprises a free-radical polymerization initiator, preferably selected from α,α'-azoisobutyronitrile, 2,2'-azobis(2,4-dimethyl valeronitrile), 2,2'-azobis(4-methoxy-2,4-dimethylvaleronitrile), dimethyl 2,2'-azobis(2-methylpropionate), 1,1'-azo-bis-1-cyclohexanenitrile, lauroyl peroxide, benzoyl peroxide, tert-butyl peroxydiethylacetate, tert-butyl peroxy-2-ethyl hexanoate, di(4-methylbenzoyl)peroxide, 1,1,3,3-tetramethylbutyl peroxy-2-ethylhexanoate, 2,5-dimethyl-2,5-di(2-ethylhexanoylperoxy)hexane, didecanoylperoxide, di(3,5,5-trimethylhexanoyl)peroxide, tert-amyl peroxypivalate, tert-butylpeeoxpeoheptanoate 1,1,3,3-tetramethylbutyl peroxy-pivalate, dicetyl peroxydicarbonate, and mixtures thereof. In a preferred embodiment, the amount of free-radical polymerization initiator present in the oil phase ranges from 0.5 to 10% by weight relative to the total weight of compounds (i), (ii), (iii), (iv) and (v).

In another embodiment, the aqueous phase of the oil-in-water emulsion comprises a free-radical polymerization initiator, preferably selected from 2,2'-azobis(2-methylpropionamidine)dihydrochloride, 2,2'-azobis-(N,N-dimethylene)isobutyramidine dihydrochloride, 2-(carbamoylazo)isobutylonitrile, 2,2-azobis(2-[2-imidazolin-2-yl]propane) dihydrochloride, 4,4-azobis-(4-cyanovaleric acid), potassium persulfate, sodium persulfate, ammonium persulfate, and mixtures thereof, and more preferably from 2,2'-azobis(2methylpropionamidine)dihydrochloride, ammonium persulfate, potassium persulfate, sodium persulfate, and mixtures thereof. In a preferred embodiment, the amount of free-radical polymerization initiator present in the aqueous phase ranges from 0.1 to 3% by weight relative to the total weight of compounds (i), (ii), (iii), (iv) and (v).

In another embodiment, the aqueous phase of the oil-in-water emulsion comprises a redox polymerization system comprising an oxidant and a reductant, the oxidant being preferably selected from α,α'-azoisobutyronitrile, 2,2'-azobis(2,4-dimethyl valeronitrile), 2,2'-azobis(4-methoxy-2,4-dimethylvaleronitrile), dimethyl 2,2'-azobis(2-methylpropionate), 1,1'-azo-bis-1-cyclohexanenitrile, lauroyl peroxide, benzoyl peroxide, tert-butyl peroxydiethylacetate, tert-butyl peroxy-2-ethylhexanoate, di(4-methylbenzoyl)peroxide, 1,1,3,3-tetramethylbutyl peroxy-2-ethylhexanoate, 2,5-dimethyl-2,5-di(2-ethylhexanoylperoxy)hexane, didecanoylperoxide, di(3,5,5-trimethylhexanoyl)peroxide, tert-amyl peroxypivalate, tert-butylpeeoxpeoheptanoate 1,1,3,3-tetra methyl butyl peroxy-pivalate, dicetyl peroxydicarbonate, 2,2'-azobis(2-methylpropionamidine)di hydrochloride, 2,2'-azobis-(N,N-dimethylene)isobutyramidine dihydrochloride, 2-(carbamoylazo)isobutylonitrile, 2,2-azobis(2-[2-imidazolin-2-yl]propane) dihydrochloride, 4,4-azobis-(4-cyanovaleric acid), potassium persulfate, sodium persulfate, ammonium persulfate, hydrogen peroxyde, and mixtures thereof, and the reductant being preferably selected from sodium metabisulfite, ascorbic acid (L and D-ascorbic acid), isoascorbic acid, cysteine, tetraethylene pentaamine, tetramethyl ethylene diamine, para-toluidine ethoxylate, sodium nitrite, dibutyl sulphide, Bruggolite® FF6 M and Bruggolite® FF7 (disodium 2-hydroxy-2sulfinatoacetate), and mixtures thereof. In a preferred embodiment, the amount of oxidant and reductant of the redox polymerization system ranges from 0.5 to 8% by weight, relative to the total weight of compounds (i), (ii), (iii) (iv) and (v).

Optionally, the pH of the oil-in-water emulsion can be increased to at least pH=5 by addition of a base, and preferably a sodium hydroxide solution, after the addition of the polymerization initiator system.

In a preferred embodiment, the oil-in-water emulsion may be obtained by mixing the oil phase with the aqueous phase at a temperature ranging from room temperature to about 90° C., and preferably between 60 and 85° C.

In the process of the invention, a polymeric stabilizer may be added to the oil phase or the aqueous phase, and preferably to the aqueous phase. Polymeric stabilizers are conventionally used to stabilize oil-in-water emulsions created by mechanical agitation.

In one embodiment, the polymeric stabilizer is selected from:
hydroxypropylmethylcellulose (HPMC),
polyvinylpyrrolidone,
copolymers of N-vinylpyrrolidone,
polyvinyl alcohols obtainable by full to partial hydrolyses of polyvinyl acetates,
copolymers of vinyl amine and vinyl alcohol,
polyacrylic and/or polymethacrylic acid,
copolymers of acrylic acid and methacrylic acid, and esters thereof,
ionic colloids such as sulphonic-acid-group-containing water-soluble polymers (e.g.
2-acrylamido-2-alkylsulphonic acids and styrene sulphonic acids), and
mixtures thereof.

In an embodiment, the polymeric stabilizer is selected from hydroxypropylmethylcellulose (HPMC), polyvinylpyrrolidone, copolymers of N-vinylpyrrolidone, polyvinyl alcohols obtainable by full to partial hydrolyses of polyvinyl acetates, copolymers of vinyl amine and vinyl alcohol, and mixtures thereof.

In one embodiment, the polymeric stabilizer has a molecular weight greater than about 5 000 g·mol$^{-1}$, preferably greater than about 10 000 g·mol$^{-1}$, more preferably greater than about 50 000 g·mol$^{-1}$. In another embodiment, the polymeric stabilizer has a molecular weight less than about 200 000 g·mol$^{-1}$, preferably less than about 150 000 g·mol$^{-1}$.

In one embodiment, the polymeric stabilizer is a polyvinyl alcohol (PVA), which has preferably a molecular weight as defined above.

In one embodiment, the polymeric stabilizer is present in an amount from about 0.1 to about 10% by weight of the weight of the aqueous phase of the oil-in-water emulsion.

After the emulsion has been stabilized (if required), it is heated to a temperature in the range from about 30° C. to about 90° C. The reaction is then left in that temperature range for about 2 hours to about 8 hours, after which time the microcapsules are formed, and the dispersion is allowed to cool to room temperature.

Optionally, deposition aids can be included to increase deposition or adhesion of the microcapsules to various natural and synthetic surfaces such as various substrates including but not limited to paper, fabric skin, hair, plastic, leather, ceramic, or other surfaces. Deposition aids can include poly(2-methacryloylethyl trimethylammonium chloride), poly(acrylamidopropyltrimonium chloride-co-acrylamide), poly(acrylamide-co-diallyldimethylammonium chloride), poly(diallyldimethylammonium) chloride, polyethylenimine, cationic polyamine, poly[(3-methyl-1-vinylimidazolium chloride)-co-(1-vinylpyrrolidone)], copolymer of acrylic acid and diallyldimethylammonium chloride, cationic guar, guar gum, an organopolysiloxane such as described in US patent application 2015/0030557. Deposition aids can also be selected from poly(ethylene-maleic anhydride), polyamine, wax, polyvinylpyrrolidone, polyvinylpyrrolidone copolymers, polyvinylpyrrolidone-ethyl acrylate, polyvinylpyrrolidone-vinyl acrylate, polyvinylpyrrolidone methylacrylate, polyvinylpyrrolidone-vinyl acetate, polyvinyl acetal, polyvinyl butyral, polysiloxane, poly(propylene maleic anhydride), maleic anhydride derivatives, copolymers of maleic anhydride derivatives, polyvinyl alcohol, gelatin, gum arabic, carboxymethyl cellulose, carboxymethyl hydroxyethyl cellulose, hydroxyethyl cellulose, sodium alginate, chitosan, casein, pectin, modified starch, polyvinyl acetal, polyvinyl butyral, polyvinyl methyl ether/maleic anhydride, polyvinyl pyrrolidone and its copolymers, poly(vinyl pyrrolidone/methacrylamidopropyltrimethylammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines, and mixtures thereof. In one embodiment, the deposition aid coats the outer surface of the shell of the microcapsule.

The aqueous dispersion of microcapsules of the invention can advantageously be incorporated into a variety of consumer products.

In a preferred embodiment, the aqueous dispersion of microcapsules of the invention is first dried before being incorporated into a variety of consumer products. Examples of conventional drying methods are spray-drying, filtration, oven drying or blending with silica particles to absorb free water of the dispersion.

Accordingly, a third aspect of the invention is concerned with a consumer product comprising an aqueous dispersion of microcapsules as defined above, said aqueous dispersion being advantageously dried before being incorporated into the consumer product. The product may be a non-edible consumer goods product, a household cleaner or laundry product, a personal care product or a cosmetic product, and in particular a laundry product, a personal care product or a cosmetic product. As used herein, a consumer product is intended to be used or consumed in the form in which it is sold, and not for further commercial manufacturing modification or resale.

Unless otherwise indicated, non-edible means non-intended for ingestion by humans or animals. This includes non-food products that may accidentally be swallowed during normal use. Notably, included within the definition of non-edible products are products for dental and oral care, such as toothpastes, mouth washes and lip balms which although not intended for ingestion may nevertheless accidentally enter the gastro-intestinal tract. The formulations and ingredients of liquid household, laundry, personal care and cosmetic products in which the aqueous dispersion of microcapsules of the invention may be used are well known to those skilled in the art, reference may be made to the following works:

Formulating Detergents and Personal Care Products: A guide to Product Development, by L. Tan Tai Ho, ISBN 1-893997-10-3, published by the AOCS Press;

A review of: "Liquid Detergents", K-Y. Li, Ed. Surfactant Science Series 67, Marcel Dekker, Inc (ISBN 0-8247-9391-9); and Harry's Cosmeticology, $8^{th}$ Edition, 2000, published by CHS Press (ISBN 0820603724).

Personal care and cosmetic products include products that can be applied to the skin, hair and nails, either as leave on or rinse off product. In the context of the invention, "rinse-off" means that the intended product use includes application to skin and/or hair followed by rinsing and/or wiping the product from the skin and/or hair within a few seconds to minutes of the application step. Personal care and cosmetic products include powders, creams, emulsions, lotions, gels and oils for the skin (face, hands, feet, etc), tinted bases (liquids and pastes) and liquid impregnated tissues; products for applying and removing make-up from the face and eyes; hair care products including hair tints and bleaches; products for waving, straightening, setting and fixing hair; shaving products including creams, foams mousses and depilatory products; sun bathing products and products for tanning without the sun; deodorant and antiperspirant products.

In one embodiment, a personal care or cosmetic product is selected from the group consisting of a shaving aid, a shampoo, a hair-conditioner product, a leave-on-skin-care product, a skin cleansing or washing product (such as a rinse-off skin cleansing or washing product), a moist tissue and a body spray, deodorant or antiperspirant.

Shaving aids specifically include foams, gels, creams and bars (reference can be made for example to U.S. Pat. Nos. 7,069,658, 6,944,952, 6,594,904, 6,182,365, 6,185,822, 6,298,558, 5,113,585).

Shampoos and hair conditioners specifically include two-in-one shampoos, solid shampoos, and shampoos especially formulated for dry or greasy hair or containing additives such as antidandruff agents. Hair conditioners may be rinse off or leave on hair conditioners also included are hair tonics, bleaches colorants, setting and styling products. Reference can be made for example to U.S. Pat. Nos. 6,162,423, 5,968,286, 5,935,561, 5,932,203, 5,837,661, 5,776,443, 5,756,436, 5,661,118, 5,618,523.

Leave-on-skin-care products comprise skin washing products, moist tissues, body sprays, deodorants and antiperspirants.

Skin washing products specifically include beauty and hygiene bar soaps, shower gels, liquid soaps, body washes, exfoliating gels and pastes (reference can be made for example to U.S. Pat. Nos. 3,697,644, 4,065,398, 4,387,040).

Moist tissues (wipes) specifically include skin cleansing wipes, baby wipes, make-up removal wipes and skin refreshing wipes (reference can be made for example to U.S. Pat. No. 4,775,582, WO02/07701, WO2007/069214, WO95/16474).

Body sprays, deodorants and antiperspirants specifically include sticks, liquid roll-on applicators and pressurized sprays.

Household products include hard surface cleaners such as cleaners for floors, solid work surfaces, tiled surfaces, crockery by hand or machine washing and mirrors and glass; and soft furnishing treatments such as liquid cleaners and refresher products such as odour treatment agents as exemplified by Febreze® (P&G). Household cleaners may be in the form of cream cleaners, isotropic liquid cleaners, spray cleaners, scent beads, liquid scent boosters and pre-moistened surface cleaning wipes (reference can be made for example to WO91/08283, EP743280, WO96/34938, WO01/23510, WO99/28428).

Spray cleaners may be dispensed from a trigger sprayer or aerosol sprayer, as are well known in the art. An aerosol sprayer dispenses the product using propellant pressure, while a trigger sprayer dispenses the product by pumping it under manual actuation. A suitable aerosol dispenser may have a dip tube or bag on valve, according to US 2015/0108163 and/or US 2011/0303766. A suitable trigger sprayer is found in U.S. Pat. No. 8,322,631.

Household products also include freshening composition which may be used in a device for the delivery of a volatile material to the atmosphere or on inanimate surfaces (e.g. fabric surfaces as a fabric refresher).

Household products further include absorbent articles, such as a sanitary product. Preferably said absorbent article comprises an absorbent core, and optionally a backsheet, topsheet, acquisition layer or outer wrapper, wherein the microcapsules of the invention are disposed on the absorbent core or between one or more of the optional layers. The absorbent article can be contained in a polybag or paper carton. The absorbent article may further comprise a lotion. The absorbent article may further comprise one or more adjunct ingredients selected from surfactants, inks, dyes, mineral oils, petrolatum, polysiloxanes, cyclodextrins, clays, silicates, aluminates, vitamins, isoflavones, flavones, metal oxides, short chain organic acids ($C_1$-$C_8$), triglycerides ($C_8$-$C_{22}$), and antioxidants.

Laundry products include powdered laundry detergents, detergent tablets and bars, liquid unit dose, pods, laundry detergent liquids include light duty liquids, heavy duty liquids, concentrated liquid detergents, non or low aqueous laundry liquids, and more specialised cleaners for woollen or dark garments; and fabric softeners and pre- and post-wash treatments such as tumble drier sheets, ironing waters and wash additives, such as the Lenor Unstoppables™ from P&G, the Dr Beckman™ range of laundry additives from Dr. Beckman, and Vanish™ laundry additives from Reckitt Benckiser.

In one embodiment, a laundry product is selected from the group consisting of a fabric softener, a fabric conditioner and a laundry detergent.

Fabric softeners and conditioners specifically include both conventional diluted (e.g. 2% to 8% by weight of softener in the product) liquid active concentration softeners and concentrated (e.g. 10% to 40% by weight of softener in the product) liquid active concentration softeners, as well as fabric conditioners which may contain ingredients to protect colors or garment shape and appearance (reference can be made for example to U.S. Pat. Nos. 6,335,315, 5,674,832, 5,759,990, 5,877,145, 5,574,179).

Laundry detergents, particularly liquid laundry detergents, specifically include light duty liquid detergents and heavy duty liquid detergents which may be structured multi-phase liquids or isotropic liquids and which may be aqueous or non-aqueous liquids. These liquids may be in bottles, unit dose sachets or pods and they may optionally contain bleaching agents or enzymes (reference can be made for example to U.S. Pat. Nos. 5,929,022, 5,916,862, 5,731,278, 5,470,507, 5,466,802, 5,460,752, 5,458,810).

The products presently disclosed may contain water and/or surface active material, either as an emulsifier, if the product is an emulsion, or as a detergent active material if the product has some kind of cleaning function. In certain embodiments, the concentration of surface active material in the product will be within the range 0.1-60% by weight; usually the level of surface active material will be 50% by weight or lower; for most products the level of surface active material will be 30% by weight or lower. On the other hand, the level of surface active material will usually be at least 0.1% by weight, preferably greater than 1.0%, and more preferably greater than 3.0% by weight. Certain product formulations are water sensitive (e.g. anti-perspirant, deodorant formulations, non-aqueous liquids packaged in water soluble polyvinyl alcohol films), and for these applications it may be desirable to spray dry the microcapsules to remove water, before the microcapsules are incorporated in the product formulation. For products which have a cleaning function, it is likely the level of surface active material will be higher, typically greater than 10% by weight, and preferably greater than 15% by weight. All percentages are expressed by weight over the weight of the product.

Examples of leave-on products containing emulsifiers are: hand and body lotions, make up removing lotions, skin creams, sunscreen products and sunless tanning products and domestic freshener sprays. Also included are articles of manufacture impregnated with liquids, for example pads or wipes impregnated with lotions for make-up application or removal, or to apply sunscreen compounds or sunless tanning agents, for personal cleansing, e.g. as moist toilet tissue or baby wipes.

Examples of personal cleansing products containing detergents are: shampoos, body washes, liquid soaps. Some cleaning products may be considered leave on products even though they are used for cleansing if there is no rinsing or further cleaning action after use. Baby wipes are an example, although used for cleaning the liquid deposited on the skin is not removed by rinsing.

The non-rinsed cosmetic, toiletry and personal care compositions described herein can contain various emulsifiers which are useful for emulsifying the various components of the products. Suitable emulsifiers can include any of a wide variety of non-ionic, cationic, anionic, and zwitterionic surface active materials as disclosed in publications such as McCutcheon's, Detergents and Emulsifiers, North American Edition (1986), published by Allured Publishing Corporation and in U.S. Pat. Nos. 5,011,681, 4,421,769, 3,755,560.

Amounts of microcapsules dosed into liquid household, laundry, personal care, and cosmetic products, may vary depending on several aspects such as the desired microcapsules concentration, the proportion of fragrance within the microcapsules, and the amount of fragrance necessary to create the olfactory effect desired. After removing all liquid components from a given product (i.e. measured as dry weight) the microcapsules may be present in an amount from 0.01 to 10% by weight, preferably from 0.05% to 2.5% by weight, more preferably from 0.1 to 1.25% by weight, over the weight of the product. The aqueous dispersion of microcapsules may be incorporated at a suitable stage in the product manufacturing process, but usually after any high-shear mixing stage. If liquid at room temperature, it is preferable that the product into which the microcapsules are to be added has a viscosity greater than 20 MPa, for example greater than 100 MPa, or greater than 1 000 MPa, or even greater than 10 000 MPa, when measured at a low (e.g. 10 rpm) spindle speed and at 25° C. If necessary, viscosity can be adjusted through the addition of conventional viscosity modifying agents. Suitable agents, as well as equipment and conditions to measure the viscosity of a product, are discussed in Rheology Modifiers Handbook, Practical Uses and Applications, by D. D. Braun and M. R. Rosen, published by William Andrew in 1999 (ISBN 978-0-8155-1441-1). Further embodiments and advantages of the present invention will become apparent to a skilled reader in light of the examples provided below.

EXAMPLES

Capsule Particle Size Measurement

Median volume diameter and span were measured with a laser diffraction/scattering particle size distribution analyzer (trade name: LA 950V2, manufactured by Horiba, Ltd.). The dispersant was 18 MΩ water. Several droplets of the emulsion or the capsule dispersion were added into the flow cell unit until an acceptable level of laser light obscuration was achieved and triplicate measurements were then immediately performed.

For the calculation of the particle size measurement, the refractive indexes were set at 1.33 (for the water dispersant) and 1.47 (for the fragrances and the microcapsules). The median capsule diameter was measured as a particle size of 50% frequency (median size) on a volumetric basis. The span was calculated according to the following formula:

$$Span = \frac{D(v; 0.9) - D(v; 0.1)}{D(v; 0.5)}$$

in which D(v; 0.9) is the particle size for 90% of the microcapsules by volume, D(v; 0.1) is the particle size for 10% of the microcapsules by volume and D(v; 0.5) is the median volume microcapsule size as previously defined.

Composition of Fragrance A (wt %)

| | |
|---|---|
| Isobornyl acetate (CAS number 125-12-2, LogP = 3.86) | 35.0 |
| Verdox (CAS number 88 41 5, LogP = 4.42) | 25.5 |
| Eucalyptol (CAS number 470-82-6, LogP = 3.13) | 8.00 |
| Undecanal (CAS number 112-44-7, LogP = 4.25) | 6.50 |
| Styrallyl acetate (CAS number 93-92-5, LogP = 2.50) | 6.50 |
| 2-methyl undecanal (CAS number 110-41-8, LogP = 4.67) | 6.00 |
| Undecalactone gamma (CAS number 104-67-6, LogP = 3.06) | 3.00 |
| 2-Ethyl pentyl-1,3-dioxolane (CAS number 4359-47-1, LogP = 2.98) | 3.00 |
| Camphor gum powder synthetic (CAS number 464-49-3, LogP = 3.04) | 2.00 |
| Ethyl 2-methylbutyrate (CAS number 7452-79-1, LogP = 2.26) | 1.50 |
| 2-Acetonaphthone (CAS number 93-08-3, LogP = 2.85) | 1.00 |
| Cycloocten-1-yl methyl carbonate (CAS number 87731-18-8, LogP = 3.27) | 0.80 |
| Delta damascene (CAS number 57378-68-4, LogP = 4.16) | 0.70 |
| 4-Methyl-2-(2-methylprop-1-enyl)oxane (CAS number 16409-43-1, LogP = 3.58) | 0.50 |

Composition of Fragrance B (wt %)

| | |
|---|---|
| Verdox (CAS number 88 41 5, LogP = 4.42) | 29.5 |
| Isobornyl acetate (CAS number 125-12-2, LogP = 3.86) | 18.4 |
| (2-Methyl-1-phenylpropan-2-yl) acetate (CAS number 151-05-3, LogP = 3.44) | 9.20 |
| Tricyclodecen-4-yl 8-acetate (CAS number 93-18-5, LogP = 3.74) | 9.20 |
| Beta- naphthyl ethyl ether (CAS number 5413-60-5, LogP = 2.85) | 6.80 |
| Ethylene brassylate (CAS number 105-95-3, LogP = 4.71) | 6.80 |
| 2,4-Dimethylcyclohex-3-ene-1-carbaldehyde (CAS number 68039-49-6, LogP = 2.85) | 6.00 |
| Undecalactone gamma (CAS number 104-67-6, LogP = 3.06) | 4.10 |
| Ethyl 2-methylbutyrate (CAS number 7452-79-1, LogP = 2.26) | 2.70 |
| 2-(2-(4-methyl-3-cyclohexenyl-1-yl)propyl)cyclopentanone (CAS number 95962-14-4, LogP = 5.05) | 2.30 |
| Ethyl-2-methylpentanoate (CAS number 39255-32-8, LogP = 2.76) | 1.80 |
| Undecanal (CAS number 112-44-7, LogP = 4.25) | 1.80 |
| Delta damascone (CAS number 57378-68-4, LogP = 4.16) | 0.90 |
| Ethyl salicylate (CAS number 118-61-6, LogP = 3.09) | 0.50 |

Example 1: Dispersibility Test of the Microcrystalline Cellulose

The dispersibility of the microcrystalline cellulose VIVAPUR® CS 4 FM, JRS—J. Rettenmaier & Söhne GmbH & Co. KG used in the following examples was confirmed by checking its dispersibility in fragrance compounds with a Log P of at least 1.5.

To this end, a dispersion of microcrystalline cellulose VIVAPUR® CS 4 FM, JRS—J. Rettenmaier & Söhne GmbH & Co. KG was tested in the following solvents:

2-Phenylethyl alcohol (Log P=1.57),
Benzaldehyde (Log P=1.71),
Linalool oxide (Log P=2.08), and
Eugenol (Log P=2.73).

10 g of microcrystalline cellulose powder VIVAPUR® CS 4 FM, JRS was added to 100 g of each solvent in a 120 mL clear glass bottle and stirred with a spatula for one minute. The obtained dispersions were observed visually: microcrystalline cellulose remained homogeneously dispersed and did not separate in any solvent for at least 60 minutes. Five different samples of the dispersions were also observed by optical microscopy with an Eclipse Ci-L Upright Microscope from Nikon Instruments, showing no object larger than 20 μm within the dispersion.

Example 2: Synthesis of Aqueous Dispersions of Microcapsules According to the Invention

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 160 g of fragrance, 10 g of multifunctional (meth)acrylate, trimethylolpropane tris(3-mercaptopropionate) (CAS number 33007-83-9) and 2,2'-azobis(2,4-dimethylvaleronitrile) were mixed together. The mixture was stirred in order to obtain a monophasic, homogeneous and transparent phase. 21 g of microcrystalline cellulose (VIVAPUR® CS 4 FM, JRS—J. Rettenmaier & Söhne GmbH & Co. KG) were then added under stirring to obtain an oil dispersion.

An aqueous phase was prepared by mixing the 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). This emulsion was placed into a sealed 500 mL-batch reactor that already contains 39.35 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing ammonium persulfate in 9.6 g of water was prepared in a beaker and poured into the reactor. 5 g of water were used to rinse the beaker and were added in the reactor too. After 15 minutes, a solution containing sodium metabisulfite in 9.5 g of water was added. The mixture was heated to 70° C. within 45 minutes and kept at this temperature for four hours.

Finally, the resultant aqueous dispersion of microcapsules was cooled to 40° C. within 30 minutes.

The volume median diameter (D(v, 0.5)) of the resultant aqueous dispersion of microcapsules was determined by laser diffraction.

Results

TABLE 1

| Example | Fragrance | Multifunctional (meth)acrylate | Amount of trimethylolpropane tris(3-mercaptopropionate) (g) | Amount of 2,2'-azobis(2,4-dimethylvaleronitrile) (g) | Amount of 10% PVA aqueous solution used for the initial aqueous phase (g) | Amount of initiators added in aqueous phase (g) | Microcapsules median volume diameter (D(v, 0.5)) (μm) |
|---|---|---|---|---|---|---|---|
| Ex. 2-1 | A | Glycerol dimethacrylate (CAS number 1830-78-0) | 1.26 | 0.05 | 1.3 | Ammonium persulfate: 0.4 Sodium metabisulfite: 0.53 | 19.0 |
| Ex. 2-2 | A | Glycerol dimethacrylate (CAS number 1830-78-0) | 1.26 | 0.15 | 1.3 | Ammonium persulfate: 0.4 Sodium metabisulfite: 0.53 | 26.1 |
| Ex. 2-3 | A | Pentaerythritol Triacrylate (CAS number 3524-68-3) | 1.26 | 0.05 | 1.95 | Ammonium persulfate: 0.4 Sodium metabisulfite: 0.53 | 9.4 |
| Ex. 2-4 | A | glycerol dimethacrylate (CAS number 1830-78-0) | 1.26 | 0.05 | 1.3 | ammonium persulfate: 0.2 sodium metabisulfite: 0.265 | 27.9 |
| Ex. 2-5 | A | Glycerol dimethacrylate (CAS number 1830-78-0) | 2.52 | 0.05 | 1.3 | Ammonium persulfate: 0.4 Sodium metabisulfite: 0.53 | 16.4 |

TABLE 1-continued

| Example | Fragrance | Multifunctional (meth)acrylate | Amount of trimethylolpropane tris(3-mercaptopropionate) (g) | Amount of 2,2'-azobis(2,4-dimethylvaleronitrile) (g) | Amount of 10% PVA aqueous solution used for the initial aqueous phase (g) | Amount of initiators added in aqueous phase (g) | Microcapsules median volume diameter (D(v, 0.5)) (μm) |
|---|---|---|---|---|---|---|---|
| Ex. 2-6 | B | Glycerol dimethacrylate (CAS number 1830-78-0) | 1.26 | 0.05 | 1.3 | Ammonium persulfate: 0.4 Sodium metabisulfite: 0.53 | 23.2 |

Example 3: Synthesis of Aqueous Dispersions of Microcapsules According to the Invention The procedure as in example 2 was followed with the addition of a 10% by weight of a solution of sodium hydroxide just after the addition of the solution of aqueous sodium metabisulfite to adjust the pH to 8.

Results

TABLE 2

| Example | Fragrance | Multifunctional (meth)acrylate | Amount of trimethylol-propane tris(3-mercapto-propionate) (g) | Amount of 2,2'-azobis(2,4-dimethylvaleronitrile) (g) | Amount of 10% PVA aqueous solution used for the initial aqueous phase (g) | Amount of initiators added in aqueous phase (g) | Microcapsules median volume diameter (D(v, 0.5)) (μm) |
|---|---|---|---|---|---|---|---|
| Ex. 3-1 | A | Glycerol dimethacrylate (CAS number 1830-78-0) | 1.26 | 0.05 | 1.3 | Ammonium persulfate: 0.4 Sodium metabisulfite: 0.53 | 21.8 |

Example 4: Synthesis of Aqueous Dispersions of Microcapsules According to the Invention Preparation of Reactants A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 135 g of fragrance, the (meth)acrylate compound(s), the multifunctional thiol compound(s) and the oil-soluble initiator are mixed. The mixture is stirred in order to obtain a monophasic, homogeneous and transparent phase. Microcrystalline cellulose is then added under stirring to obtain an oil dispersion.

A dispersion of silica in water was prepared separately by stirring 0.9 g of Aerosil® R816 silica and 180 g of water containing 100 mg·L$^{-1}$ of sodium bicarbonate: during 5 minutes using a stirrer bar and at 10 000 rpm during 30 seconds using a high-shear mixer (e.g. Ystral X 10/20 E3-1050 W equipped with a Dispermix head of diameter 40/54 mm).

The oil dispersion and the dispersion of silica in water were then stirred together at 10 000 rpm for one minute using a high-shear mixer (e.g. Ystral X 10/20 E3-1050 W equipped with a Dispermix head of diameter 40/54 mm).

310 g of this emulsion was placed into a sealed 500 mL-batch reactor equipped with a condenser, a thermometer, a bottom outlet valve, and an anchor stirrer. During all the process, the mixture was stirred at 250 rpm. 52 g of the 10% PVA aqueous solution previously prepared were added. 39.7 g of water were added. Optionally, the reductant of the redox initiator system was added. Nitrogen was bubbled through the mixture. The mixture was stirred at room temperature during 30 minutes, and then heated to 70° C. over one hour. After a specific duration at 70° C., a solution containing initiator(s) in 5 g of water was added. Finally, the resulting aqueous dispersion of microcapsules was cooled to room temperature during one hour.

The volume median diameter (D(v, 0.5)) of the resultant aqueous dispersion of microcapsules was determined by laser diffraction.

Results

TABLE 3

| Example | Fragrance | Microcrystalline cellulose | (Meth)acrylate compound(s) | Multifunctional thiol compound(s) | Oil-soluble initiator | Initiator(s) added in aqueous phase and time of addition | Microcapsules median volume diameter (D(v, 0.5)) (μm) |
|---|---|---|---|---|---|---|---|
| Ex. 4-1 | B | VIVAPUR ® CS4 FM: 16.38 g | Methacrylic acid: 5.1 g 1,4-butane diol dimethacrylate: 3.7 g 3-(Trimethoxysilyl)propyl methacrylate: 2.15 g | — | 2,2'-Azobis(2,4-dimethylvaleronitrile): 0.5 g | 2,2'-Azobis(2-methylpropionamidine) dihydrochloride: 0.19 g, after 2 h at 70° C. | 32.1 |
| Ex. 4-2 | B | VIVAPUR ® CS4 FM: 18.34 g | Methacrylic acid: 4.1 g 1,4-butane diol dimethacrylate: 2.9 g 3-(Trimethoxysilyl)propyl methacrylate: 1.7 g | — | 2,2'-Azobis(2,4-dimethylvaleronitrile): 0.4 g | 2,2'-Azobis(2-methylpropionamidine) dihydrochloride: 0.19 g, after 2 h at 70° C. | 29.8 |
| Ex. 4-3 | B | VIVAPUR ® CS4 FM: 18.34 g | Methacrylic acid: 4.1 g 1,4-butane diol dimethacrylate: 2.9 g 3-(Trimethoxysilyl)propyl methacrylate: 1.7 g | — | 2,2'-Azobis(2,4-dimethylvaleronitrile): 0.4 g | Potassium persulfate: 0.19 g, after 1 h at 70° C. | 27.0 |
| Ex. 4-4 | A | VIVAPUR ® CS4 FM: 18.34 g | Methacrylic acid: 4.1 g 1,4-butane diol dimethacrylate: 2.9 g 3-(Trimethoxysilyl)propyl methacrylate: 1.7 g | — | 2,2'-Azobis(2,4-dimethylvaleronitrile): 0.4 g | 2,2'-Azobis(2-methylpropionamidine) dihydrochloride: 0.19 g, after 2 h at 70° C. | 30.8 |
| Ex. 4-5 | A | VIVAPUR ® CS 4 FM: 23.84 g | Methacrylic acid: 2.4 g 1,4-butane diol dimethacrylate: 1.7 g 3-(Trimethoxysilyl)propyl methacrylate: 1.7 g | — | 2,2'-Azobis(2,4-dimethylvaleronitrile): 0.4 g | 2,2'-Azobis(2-methylpropionamidine) dihydrochloride: 0.19 g, after 2 h at 70° C. | 23.7 |
| Ex. 4-6 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | — | 2,2'-Azobis(2,4-dimethylvaleronitrile): 0.6 g | 2,2'-Azobis(2-methylpropionamidine) dihydrochloride: 0.19 g, after 2 h at 70° C. | 26.5 |
| Ex. 4-7 | A | VIVAPUR ® CS 4 FM: 18.34 g | Methacrylic acid: 4.1 g 1,4-butane diol dimethacrylate: 2.1 g 3-(Trimethoxysilyl)propyl methacrylate: 1.7 g | Trimethylolpropane tris(3-mercaptopropionate): 0.9 g | 2,2'-Azobis(2,4-dimethylvaleronitrile): 0.4 g | 2,2'-Azobis(2-methylpropionamidine) dihydrochloride: 0.19 g, after 2 h at 70° C. | 26.2 |
| Ex. 4-8 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | Trimethylolpropane tris(3-mercaptopropionate): 1.2 g | 2,2'-Azobis(2,4-dimethylvaleronitrile): 0.4 g | Potassium persulfate: 0.19 g, after 2 h at 70° C. | 28.0 |
| Ex. 4-9 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | Trimethylolpropane tris(3-mercaptopropionate): 1.2 g | 2,2'-Azobis(2,4-dimethylvaleronitrile): 0.4 g | 2,2'-Azobis(2-methylpropionamidine) dihydrochloride: 0.19 g, after 2 h at 70° C. | 30.5 |
| Ex. 4-10 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | Trimethylolpropane tris(3-mercaptopropionate): 2.4 g | 2,2'-Azobis(2,4-dimethylvaleronitrile): 0.4 g | 2,2'-Azobis(2-methylpropionamidine) dihydrochloride: 0.19 g, after 2 h at 70° C. | 24.2 |
| Ex. 4-11 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | Ethylene glycol bis-mercaptoacetate: 1.2 g | 2,2'-Azobis(2,4-dimethylvaleronitrile): 0.4 g | 2,2'-Azobis(2-methylpropionamidine) dihydrochloride: 0.19 g, after 2 h at 70° C. | 27.1 |
| Ex. 4-12 | A | VIVAPUR ® CS 4 FM: 18.34 g | Methacrylic acid: 4.1 g 1,4-butane diol dimethacrylate: 2.9 g 3-(Trimethoxysilyl)propyl methacrylate: 1.7 g | Ethylene glycol bis-mercaptoacetate: 2.4 g | 2,2'-Azobis(2,4-dimethylvaleronitrile): 0.4 g | 2,2'-Azobis(2-methylpropionamidine) dihydrochloride: 0.19 g, after 2 h at 70° C. | 28.9 |

TABLE 3-continued

| Example | Fragrance | Microcrystalline cellulose | (Meth)acrylate compound(s) | Multifunctional thiol compound(s) | Oil-soluble initiator | Initiator(s) added in aqueous phase and time of addition | Microcapsules median volume diameter (D(v, 0.5)) (μm) |
|---|---|---|---|---|---|---|---|
| Ex. 4-13 | A | VIVAPUR® CS 4 FM: 18.34 g | Methacrylic acid: 4.1 g 1,4-butane diol dimethacrylate: 2.9 g 3-(Trimethoxysilyl)propyl methacrylate: 1.7 g | — | Lauroyl peroxide: 0.64 g | Tetraethylene pentaamine (reductant of the redox initiator system): 0.15 g (just after addition of PVA and water in the reactor) 2,2'-Azobis(2-methylpropionamidine) dihydrochloride: 0.19 g, after 2 h at 70° C. | 28.4 |
| Ex. 4-14 | A | VIVAPUR® CS 4 FM: 18.34 g | Methacrylic acid: 4.1 g 1,4-butane diol dimethacrylate: 2.9 g 3-(Trimethoxysilyl)propyl methacrylate: 1.7 g | Ethylene glycol bis-mercaptoacetate: 2.4 g | Lauroyl peroxide: 0.64 g | Tetraethylene pentaamine (reductant of the redox initiator system): 0.15 g (just after addition of PVA and water in the reactor) 2,2'-Azobis(2-methylpropionamidine) dihydrochloride: 0.19 g, after 2 h at 70° C. | 26.3 |
| Ex. 4-15 | A | VIVAPUR® CS 4 FM: 18.34 g | Methacrylic acid: 4.1 g 1,4-butane diol dimethacrylate: 2.9 g 3-(Trimethoxysilyl)propyl methacrylate: 1.7 g | Trimethylolpropane tris(3-Mercaptopropionate): 2.4 g | Lauroyl peroxide: 0.64 g | Tetraethylene pentaamine: 0.15 g (just addition of PVA and water in the reactor) 2,2'-Azobis(2-methylpropionamidine) dihydrochloride: 0.19 g, after 2 h at 70° C. | 26.3 |
| Ex. 4-16 | A | VIVAPUR® CS 4 FM: 18.34 g | Methacrylic acid: 4.1 g 1,4-butane diol dimethacrylate: 2.9 g 3-(Trimethoxysilyl)propyl methacrylate: 1.7 g | Trimethylolpropane tris(3-Mercaptopropionate): 1.2 g | 2,2'-Azobis(2,4-dimethylvaleronitrile): 2.4 g | 2,2'-Azobis(2-methylpropionamidine) dihydrochloride: 0.19 g, after 2 h at 70° C. | 27.4 |

Comparative Example 1

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 160 g of fragrance A, 10 g of glycerol dimethacrylate, 1.26 g of trimethylolpropane tris(3-mercaptopropionate) and 0.05 g of 2,2'-azobis(2,4-dimethylvaleronitrile) were mixed together. The mixture was stirred in order to obtain a monophasic, homogeneous and transparent phase.

An aqueous phase was prepared by mixing 1.3 g of the 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). This emulsion was placed into a sealed 500 mL-batch reactor that already contains 39.35 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing 0.4 g of ammonium persulfate in 9.6 g of water was prepared in a beaker and poured into the reactor. 5 g of water were used to rinse the beaker and were added in the reactor too. After 15 minutes, a solution containing 0.53 g of sodium metabisulfite in 9.5 g of water was added. The mixture was heated to 70° C. within 45 minutes and kept at this temperature for four hours. Finally, the resultant aqueous dispersion of microcapsules was cooled to 40° C. within 30 minutes.

The volume median diameter (D(v, 0.5)) of the resultant aqueous dispersion of microcapsules was determined by laser diffraction.

Results

TABLE 4

| Example | Fragrance | Microcapsules median volume diameter (D(v, 0.5)) (μm) |
|---|---|---|
| Ex. C1-1 | A | 17.4 |

Comparative Example 2

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 160 g of fragrance, 10 g of glycerol dimethacrylate, 1.26 g of trimethylolpropane tris(3-mercaptopropionate) and 0.05 g of 2,2'-azobis(2,4-dimethylvaleronitrile) were mixed together. The mixture was stirred in order to obtain a monophasic, homogeneous and transparent phase. 2 g of microcrystalline cellulose (VIVAPUR® CS 4 FM, JRS—J. Rettenmaier & Söhne GmbH & Co. KG) were then added under stirring to obtain an oil dispersion.

An aqueous phase was prepared by mixing 1.3 g of the 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). This emulsion was placed into a sealed 500 mL-batch reactor that already contains 39.35 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing 0.4 g of ammonium persulfate in 9.6 g of water was prepared in a beaker and poured into the reactor. 5 g of water were used to rinse the beaker and were added in the reactor too. After 15 minutes, a solution containing 0.53 g of sodium metabisulfite in 9.5 g of water was added. The mixture was heated to 70° C. within 45 minutes and kept at this temperature for four hours. Finally, the resultant aqueous dispersion of microcapsules was cooled to 40° C. within 30 minutes.

The volume median diameter (D(v, 0.5)) of the resultant aqueous dispersion of microcapsules was determined by laser diffraction.

Results

TABLE 5

| Example | Fragrance | Microcapsules median volume diameter (D(v, 0.5)) (μm) |
| --- | --- | --- |
| Ex. C2-1 | A | 22.2 |

Comparative Example 3

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 160 g of fragrance, 10 g of glycerol dimethacrylate, 1.26 g of trimethylolpropane tris(3-mercaptopropionate) and 0.05 g of 2,2'-azobis(2,4-dimethylvaleronitrile) were mixed together. The mixture was stirred in order to obtain a monophasic, homogeneous and transparent phase.

An aqueous phase was prepared by mixing 1.3 g of the 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). This emulsion was placed into a sealed 500 mL-batch reactor that already contains 39.35 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing 0.4 g of ammonium persulfate in 9.6 g of water was prepared in a beaker and poured into the reactor. 5 g of water were used to rinse the beaker and were added in the reactor too. After 15 minutes, a solution containing 0.53 g of sodium metabisulfite in 9.5 g of water was added. pH was adjusted to 8 by addition of a 10% by weight sodium hydroxide solution. The mixture was heated to 70° C. within 45 minutes and kept at this temperature for four hours. Finally, the resultant aqueous dispersion of microcapsules was cooled to 40° C. within 30 minutes.

The volume median diameter (D(v, 0.5)) of the resultant aqueous dispersion of microcapsules was determined by laser diffraction.

Results

TABLE 6

| Example | Fragrance | Microcapsules median volume diameter (D(v, 0.5)) (μm) |
| --- | --- | --- |
| Ex. C3-1 | A | 17.6 |

Comparative Example 4

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 4.1 g of methacrylic acid, 2.9 g of 1,4-butane diol dimethacrylate, 1.7 g of 3-(trimethoxysilyl)propyl methacrylate, 1.2 g of trimethylolpropane tris(3-mercaptopropionate), 1.2 g of 2,2'-azobis(2,4-dimethylvaleronitrile) and 135 g of fragrance are mixed. The mixture was stirred in order to obtain a monophasic, homogeneous and transparent phase.

A dispersion of silica in water was prepared separately by stirring 0.9 g of Aerosil® R816 silica and 180 g of water containing 100 mg·$L^{-1}$ of sodium bicarbonate: during 5 minutes using a stirrer bar and at 10 000 rpm during 30 seconds using a high-shear mixer (e.g. Ystral X 10/20 E3-1050 W equipped with a Dispermix head of diameter 40/54 mm).

The oil dispersion and the dispersion of silica in water were then stirred together at 10 000 rpm for one minute using a high-shear mixer (e.g. Ystral X 10/20 E3-1050 W equipped with a Dispermix head of diameter 40/54 mm).

310 g of this emulsion was placed into a sealed 500 mL-batch reactor equipped with a condenser, a thermometer, a bottom outlet valve, and an anchor stirrer. During all the process, the mixture was stirred at 250 rpm. 52 g of the 10%

PVA aqueous solution previously prepared were added. 39.7 g of water were added. Nitrogen was bubbled through the mixture. The mixture was stirred at room temperature during 30 minutes, and then heated to 70° C. over one hour. After two hours at 70° C., a solution containing 0.19 g of 2,2'-azobis(2-methylpropionamidine)dihydrochloride in 5 g of water was added. Finally, the resulting aqueous dispersion of microcapsules was cooled to room temperature during one hour.

TABLE 7

| Example | Fragrance | Microcapsules median volume diameter (D(v, 0.5)) (μm) |
|---|---|---|
| Ex. C4-1 | A | 29.8 |

Comparative Example 5

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersion of Microcapsules 4.1 g of methacrylic acid, 2.9 g of 1,4-butane diol dimethacrylate, 1.7 g of 3-(trimethoxysilyl)propyl methacrylate, 1.2 g of trimethylolpropane tris(3-mercaptopropionate), 1.2 g of 2,2'-azobis(2,4-dimethylvaleronitrile) and 135 g of fragrance are mixed. The mixture is stirred in order to obtain a monophasic, homogeneous and transparent phase. 2 g of microcrystalline cellulose (VIVAPUR® CS 4 FM, JRS—J. Rettenmaier & Söhne GmbH & Co. KG) were then added under stirring to obtain an oil dispersion.

A dispersion of silica in water was prepared separately by stirring 0.9 g of Aerosil® R816 silica and 180 g of water containing 100 mg·L$^{-1}$ of sodium bicarbonate: during 5 minutes using a stirrer bar and at 10 000 rpm during 30 seconds using a high-shear mixer (e.g. Ystral X 10/20 E3-1050 W equipped with a Dispermix head of diameter 40/54 mm).

The oil dispersion and the dispersion of silica in water were then stirred together at 10 000 rpm for one minute using a high-shear mixer (e.g. Ystral X 10/20 E3-1050 W equipped with a Dispermix head of diameter 40/54 mm).

310 g of this emulsion was placed into a sealed 500 mL-batch reactor equipped with a condenser, a thermometer, a bottom outlet valve, and an anchor stirrer. During all the process, the mixture was stirred at 250 rpm. 52 g of the 10%

PVA aqueous solution previously prepared were added. 39.7 g of water were added. Nitrogen was bubbled through the mixture. The mixture was stirred at room temperature during 30 minutes, and then heated to 70° C. over one hour. After two hours at 70° C., a solution containing 0.19 g of 2,2'-azobis(2-methylpropionamidine)dihydrochloride in 5 g of water was added. Finally, the resulting aqueous dispersion of microcapsules was cooled to room temperature during one hour.

TABLE 8

| Example | Fragrance | Microcapsules median volume diameter (D(v, 0.5)) (μm) |
|---|---|---|
| Ex. C5-1 | A | 31.2 |

Physical Stability of the Aqueous Dispersions of Microcapsules Over the Time

The physical stability of the aqueous dispersion of microcapsules of Ex. 4-9 (invention) and of the comparative aqueous dispersions of microcapsules of comparative examples 4 and 5 (Ex. C$_4$-1 and Ex. C5-1) was compared. The different aqueous dispersions of microcapsules were stored in closed 120 mL clear glass bottles at room temperature, without any stirring, during specific periods of time, and it was observed whether a physical separation (creaming or sedimentation) upon storage occurs. The height of the creamed or sedimented phase was measured with a 20 cm ruler and compared of the global height of the sample in the bottle to provide a percentage of creaming or a percentage of sedimentation.

The results are summarised in Table 9 below:

TABLE 9

|  | Ex. C4-1 | Ex. C5-1 | Ex. 4-9 (invention) |
|---|---|---|---|
| After 45 min | 9% of creaming | 6% of creaming | No separation |
| After 2 h 30 | 15% of creaming | 8% of creaming | No separation |
| After 4 h | 20% of creaming | 15% of creaming | No separation |
| After 5 h | 30% of creaming | 15% of creaming | No separation |
| After 23 h | 30% of creaming | 26% of creaming | No separation |
| After 30 h | 50% of creaming | 30% of creaming | No separation |
| After 4 days | 50% of creaming | 50% of creaming | No separation |
| After 7 days | 50% of creaming | 50% of creaming | 10% of creaming |
| After 4 weeks | 50% of creaming | 50% of creaming | 15% of creaming |

The results show that the aqueous dispersion of microcapsules according to the invention separates very slowly, and much more slowly than the comparative aqueous dispersion of microcapsules without nanocellulose or microcrystalline cellulose (Ex. C$_4$-1) or with a low amount of nanocellulose or microcrystalline cellulose (Ex. C5-1).

The physical stability of the aqueous dispersion of microcapsules of Ex. 3-1 (invention) and of the comparative aqueous dispersion of microcapsules of comparative example 3 (Ex. C3-1) was also compared. The aqueous dispersions of microcapsules were let at room temperature, without any stirring, during specific periods of time, and it was observed whether a physical separation (creaming or sedimentation) upon storage occurs.

TABLE 10

| | Ex. C3-1 | Ex. 3-1 (invention) |
|---|---|---|
| After 3 days | <5% of creaming<br><5% of sedimentation | No separation |
| After 7 days | 30% of creaming<br>10% of sedimentation | No separation |
| After 17 days | 30% of creaming<br>10% of sedimentation | No separation |
| After 4 weeks | 30% of creaming<br>10% of sedimentation | No separation |

The results show that the aqueous dispersion of microcapsules according to the invention (Ex. 3-1) did not separate after four weeks of storage, contrary to the comparative aqueous dispersion of microcapsules without nanocellulose or microcrystalline cellulose (Ex. C3-1) that separates in few days.

Olfactory Test When Applied in a Fabric Softener (Before and After Storage)

Preparation of fabric softener formulations containing the aqueous dispersions of microcapsules:

The aqueous dispersion of microcapsules of Ex. 2-1 (invention) and the aqueous dispersion of microcapsules of comparative example 1 (Ex. C1-1) were mixed with commercial Downy® Ultra Free & Gentle Liquid Fabric Conditioner. The amount of aqueous dispersion of microcapsules was adjusted to reach a concentration of 0.10% by weight of encapsulated fragrance in the fabric softener formulation.

The fabric softener mixtures were directly washed or stored in an oven at 40° C. during four weeks before being washed.

The fabric softener formulations were washed according to the following procedure:

Cotton terry towels, prewashed with an unperfumed liquid detergent at 90° C., were placed in a Miele PW 6065 Vario washing machine along with a ballast load of large cotton towels. The total load was 2.3 kg. A washing cycle was performed at 40° C. (spin drying: 1 300 rpm). 40 mL of a fabric softener formulation was added during the rinsing process. The cotton terry towels (30 cm*20 cm, each about 50 g) were dried for 24 hours at room conditions.

12 to 14 expert panelists trained to rate fragrance intensity scored the olfactive intensity of the samples. For each assessment, the panelists were asked to rate the intensity of the fragrance perception on a scale ranging from 1 to 10, wherein 1 means no odour and 10 means very strong odour. The intensity scores were statistically treated by analysis of variance ANOVA (confidence interval (%): 95; tolerance: 0.0001).

For the capsules freshly applied in the fabric softener formulation, the panelists evaluated the samples at the following steps:

First step: on wet fabrics with minimal gentle handling,

Second step: on dry fabrics after indoor line drying for 24 hours: before rubbing, after a soft touch and after rubbing three times between both hands, Third step: on dry fabrics previously rubbed, after one more week of drying: before rubbing, after a soft touch and after rubbing three between both hands.

The olfactory performances of the capsules when freshly applied in the fabric softener formulation are summarised in Table 11 below:

TABLE 11

| Samples with: | First Step Wet Intensity | Second step Dry Pre-Rub Intensity | Second step Dry Soft-touch Intensity | Second step Dry Post-Rub intensity | Third step Dry Pre-Rub Intensity | Third step Dry Soft-touch Intensity | Third step Dry Post-Rub intensity |
|---|---|---|---|---|---|---|---|
| Ex. C1-1 | 3.0* | 0.6 | 2.5 | 4.5 | 1.4 | 2.5 | 4.2 |
| Ex. 2-1 | 2.2 | 0.8 | 3.6* | 5.3* | 1.6 | 3.4* | 5.5* |

Significance between samples C1-1 and 2-1 at the same test stage at the 95% confidence interval is marked by an asterisk (*).

The perceived intensity at the wet stage was lower for the aqueous dispersion of microcapsules of the invention, meaning that less fragrance was released during the washing procedure. Perceived intensity on dry fabrics was also higher for the aqueous dispersion of microcapsules of the invention.

For the capsules stored in the fabric softener formulation during four weeks at 40° C., the panelists evaluated the samples on dry fabrics after indoor line drying for 24 hours: before rubbing, after a soft touch and after rubbing three times between both hands.

The olfactory performances of the capsules after four weeks of storage at 40° C. in the fabric softener formulation are summarised in Table 12 below:

TABLE 12

| Samples with: | Dry Pre-Rub Intensity | Dry Soft-touch Intensity | Dry Post-Rub intensity |
|---|---|---|---|
| Ex. C1-1 | 0.4 | 1.6 | 2.6 |
| Ex. 2-1 | 0.5* | 2.0 | 4.0* |

Significance between samples C1-1 and 2-1 at the same test stage at the 95% confidence interval is marked by an asterisk (*).

After storage in the fabric softener formulation, perceived intensity on dry fabrics was still higher at all stages for the aqueous dispersion of microcapsules of the invention (Ex. 2-1) rather than for the comparative aqueous dispersion of microcapsules synthesized without nanocellulose or microcrystalline cellulose (Ex. C1-1).

Thermal Properties of the Polymer Constituting the Aqueous Dispersions of Microcapsules The polymers of the aqueous dispersions of microcapsules of Ex. 2-1 and of Ex. C1-1 were extracted by the following procedure:

The aqueous dispersion of microcapsules was rehomogeneized by stirring with a spatula, In a 1 L-beaker previously washed with absolute ethanol, 100 g of aqueous dispersion of microcapsules were poured and 500 g of ethanol were added, The dispersion was stirred with a spatula and the beaker was placed in an ultrasonic bath for 30 minutes, The filtration of the diluted dispersion was performed on a Büchner funnel equipped with a filter paper, grade 393. Eight additional washings with ethanol were performed by adding 300 g of ethanol on the polymer, letting the dispersion for 30 minutes in the ultrasonic bath, and further filtrating on the Büchner, The powder was dried at room temperature. When it was dried, it was crushed with a spatula and if needed with a mortar to obtain a fine powder.

Potential residues of fragrance and reactants were quantified by ethanol extraction and GC-MS/FID (Gas Chromatography-Mass Spectrometry/Flame Ionization Detector) analysis. For this, 0.05 g of powder were placed in a 15 mL-glass bottle, 2 g of ethanol were added. The mixture was stirred during 20 minutes in an ultrasonic bath. The ethanol phase was withdrawn filtrated on 0.45 microns filter and analyzed by GC-MS/FID. Residues correspond to some molecules contained in the fragrance and represent below 0.1% by weight in the obtained powder.

The simple blend of microcrystalline cellulose powder VIVAPUR® CS 4 FM and of Ex. C1-1 polymer was prepared by mixing 0.88 g of VIVAPUR® CS 4 FM and 1.12 g of Ex. C1-1 polymer. The blend was thus made of 56% by weight of VIVAPUR® CS 4 FM and 44% by weight of Ex. C1-1 polymer (same proportions as in Ex. 2-1). The two powders were crushed and mixed together in a mortar during 15 minutes.

ThermoGravimetric Analyses (TGA) were carried out by using the instrument Seiko EXSTAR 6200 TGA/DTA. 10 mg of the polymer powder were placed in an alumina sample pan and the run was carried out at 10° C./min from 30 to 600° C. under nitrogen flow (10 mL/min).

The first derivatives of the TGA curves (the DTG (Derivative ThermoGravimetry) curves) for the Ex. 2-1 polymer and for the comparative simple blend of microcrystalline cellulose powder VIVAPUR® CS 4 FM and of Ex. C1-1 polymer are showed in FIG. 1 (in plain line: DTG curve for the Ex. 2-1 polymer; in dashed line: DTG curve for the comparative simple blend of microcrystalline cellulose powder VIVAPUR® CS 4 FM and Ex. C1-1 polymer).

It can be observed that the polymer from the aqueous dispersion of microcapsules of the invention (Ex. 2-1) has different thermal properties than the comparative simple blend of microcrystalline cellulose and Ex. C1-1 polymer, meaning that the reaction product of the invention is a different product (not a simple blend of polymer and microcrystalline cellulose).

Example 5: Synthesis of Aqueous Dispersions of Microcapsules According to the Invention Preparation of Reactants A 10% PVA [poly(vinyl alcohol)] aqueous solution was prepared in advance by dissolving Selvol® 823, hydrolyzed to 87-89% (Sekisui), in water.

Preparation of Aqueous Dispersions of Microcapsules 160 g of fragrance and possible solvent, 10 g of glycerol dimethacrylate (CAS number 1830-78-0), 1.26 g of monofunctional or multifunctional thiol compound(s), and 0.05 g of 2,2'-azobis(2,4-dimethylvaleronitrile) were mixed together. The mixture was stirred in order to obtain a monophasic, homogeneous and transparent phase. 21 g of microcrystalline cellulose were then added under stirring to obtain an oil dispersion.

An aqueous phase was prepared by mixing 1.3 g of the 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). This emulsion was placed into a sealed 500 mL-batch reactor that already contains 39.35 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing 0.4 g of ammonium persulfate in 9.6 g of water was prepared in a beaker and poured into the reactor. 5 g of water were used to rinse the beaker and were added in the reactor too. After 15 minutes, a solution containing 0.53 g of sodium metabisulfite in 9.5 g of water was added. The mixture was heated to 70° C. within 45 minutes and kept at this temperature for four hours. A solution of sodium hydroxide at 10% by weight was added to adjust the pH to 8. Finally, the resultant aqueous dispersions of microcapsules were cooled to 40° C. within 30 minutes.

The volume median diameter (D(v, 0.5)) of the resultant aqueous dispersions of microcapsules was determined by laser diffraction.

Results

TABLE 13

| Example | Fragrance and possible solvent | Microcrystalline cellulose* | Monofunctional or multifunctional thiol compound(s) | Reductant added in aqueous phase | Microcapsules median volume diameter (D(v, 0.5)) (μm) |
| --- | --- | --- | --- | --- | --- |
| Ex. 5-1 | A | VIVAPUR® CS 4 FM | Trimethylolpropane tris(3-mercaptopropionate) | Cystein | 15.4 |
| Ex. 5-2 | A | VIVAPUR® CS 4 FM | Trimethylolpropane tris(3-mercaptopropionate) | L-ascorbic acid | 22.3 |
| Ex. 5-3 | A | VIVAPUR® CS 4 FM | 1-Dodecanethiol | Sodium metabisulfite | 20.6 |

TABLE 13-continued

| Example | Fragrance and possible solvent | Microcrystalline cellulose* | Monofunctional or multifunctional thiol compound(s) | Reductant added in aqueous phase | Microcapsules median volume diameter (D(v, 0.5)) (μm) |
|---|---|---|---|---|---|
| Ex. 5-4 | A | VIVAPUR® CS 4 FM | Ethylene glycol bis(3-mercaptopropionate) | Sodium metabisulfite | 11.7 |
| Ex. 5-5 | A | TECHNOCEL FM 8 | Ethylene glycol bis(3-mercaptopropionate) | Sodium metabisulfite | 16.0 |
| Ex. 5-6 | A | SENSOCEL® 5 | Trimethylolpropane tris(3-mercaptopropionate) | Sodium metabisulfite | 14.3 |
| Ex. 5-7 | A | SENSOCEL® 5+ | Trimethylolpropane tris(3-mercaptopropionate) | Sodium metabisulfite | 14.3 |
| Ex. 5-8 | 80 wt % of fragrance A + 20 wt % of isopropyl myristate | VIVAPUR® CS 4 FM | Trimethylolpropane tris(3-mercaptopropionate) | Sodium metabisulfite | 25.2 |

*The suppliers of the microcrystalline celluloses are:
VIVAPUR® CS 4 FM from JRS-J. Rettenmaier & Söhne GmbH & Co. KG,
TECHNOCEL® FM 8 from CFF GmbH & Co. KG,
SENSOCEL® 5 from CFF GmbH & Co. KG,
SENSOCEL® 5+ from CFF GmbH & Co. KG (microcrystalline cellulose coated with ORYZA SATIVA BRAN CERA/ORYZA SATIVA (RICE) BRAN WAX).

These results show that different microcrystalline celluloses and different redox polymerization systems can be used.

Example 6: Synthesis of Aqueous Dispersions of Microcapsules According to the Invention Preparation of Reactants A 10% PVA [poly(vinyl alcohol)] aqueous solution was prepared in advance by dissolving Selvol® 823, hydrolyzed to 87-89% (Sekisui), in water.

Preparation of Aqueous Dispersions of Microcapsules 160 g of fragrance, 5.6 g of glycerol dimethacrylate (CAS number 1830-78-0), optionally trimethylolpropane tris(3-mercaptopropionate) (CAS number 33007-83-9) and 0.05 g of 2,2'-azobis(2,4-dimethylvaleronitrile) were mixed together. The mixture was stirred in order to obtain a monophasic, homogeneous and transparent phase. 25.4 g of VIVAPUR® CS 4 FM microcrystalline cellulose was then added under stirring to obtain an oil dispersion.

An aqueous phase was prepared by mixing 10% PVA aqueous solution previously prepared and 160 g of water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). 320 g of this emulsion was placed into a sealed 500 mL-batch reactor that already contains 56.2 g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing ammonium persulfate in 9.6 g of water was prepared in a beaker and poured into the reactor. 5 g of water were used to rinse the beaker and were added in the reactor too. After 15 minutes, a solution containing sodium metabisulfite in 9.5 g of water was added. The mixture was heated to 70° C. within 45 minutes and kept at this temperature for four hours. A solution of sodium hydroxide at 10% by weight was added to adjust the pH to 8. Finally, the resultant aqueous dispersions of microcapsules were cooled to 40° C. within 30 minutes.

The volume median diameter (D(v, 0.5)) of the resultant aqueous dispersion of microcapsules was determined by laser diffraction.

TABLE 14

| Example | Fragrance | Weight of trimethylolpropane tris(3-mercaptopropionate) (g) | Weight of 10% PVA aqueous solution in the initial aqueous phase (g) | Weight of ammonium persulfate (g) | Weight of sodium metabisulfite (g) | Microcapsules median volume diameter (D(v, 0.5)) (μm) |
|---|---|---|---|---|---|---|
| Ex. 6-1 | A | 0 | 2.79 | 0.40 | 0.53 | 10.3 |
| Ex. 6-2 | A | 0.19 | 1.96 | 0.30 | 0.265 | 11.0 |
| Ex. 6-3 | A | 0.41 | 1.94 | 0.30 | 0.265 | 13.1 |
| Ex. 6-4 | A | 0.63 | 1.95 | 0.30 | 0.265 | 13.6 |

Example 7: Synthesis of Aqueous Dispersions of Microcapsules According to the Invention

Preparation of Reactants

A 10% PVA [poly(vinyl alcohol)] aqueous solution was prepared in advance by dissolving Selvol® 823, hydrolyzed to 87-89% (Sekisui), in water.

Preparation of Aqueous Dispersions of Microcapsules 160 g of fragrance, 7.9 g of glycerol dimethacrylate (CAS number 1830-78-0), trimethylolpropane tris(3-mercaptopropionate) (CAS number 33007-83-9) and 0.05 g of 2,2'-azobis(2,4-dimethylvaleronitrile) were mixed together. The mixture was stirred in order to obtain a monophasic, homogeneous and transparent phase. 25.4 g of VIVAPUR® CS 4 FM microcrystalline cellulose was then added under stirring to obtain an oil dispersion.

An aqueous phase was prepared by mixing 10% PVA aqueous solution previously prepared and water.

The oil dispersion and the aqueous phase were then stirred together at 10 000 rpm for one minute using a high-shear mixer (e.g. Ystral X 10/20 E3-1050 W equipped with a Dispermix head of diameter 40/54 mm). X g of this emulsion was placed into a sealed 500 mL-batch reactor that already contains Y g of the 10% PVA aqueous solution previously prepared. The reactor was equipped with a condenser, a thermometer, a bottom outlet valve and an anchor stirrer. The mixture was stirred at 250 rpm. Nitrogen was bubbled through the mixture. A solution containing 0.4 g of ammonium persulfate in 9.6 g of water was prepared in a beaker and poured into the reactor. 5 g of water were used to rinse the beaker and were added in the reactor too. After 15 minutes, a solution containing 0.53 g of sodium metabisulfite in 9.5 g of water was added. The mixture was heated to 70° C. within 45 minutes and kept at this temperature for four hours. A solution of sodium hydroxide at 10% by weight was added to adjust the pH to 8. Finally, the resultant aqueous dispersions of microcapsules were cooled to 40° C. within 30 minutes.

The volume median diameter (D(v, 0.5)) of the resultant aqueous dispersions of microcapsules was determined by laser diffraction.

Example 8: Olfactory Test When Applied in a Fabric Softener

Preparation of Fabric Softener Formulations Containing the Aqueous Dispersions of Microcapsules of the Invention Aqueous dispersions of microcapsules according to the invention were mixed with commercial Downy® Ultra Free & Gentle Liquid Fabric Conditioner, to reach a concentration of 0.10% by weight of encapsulated fragrance in the fabric softener formulation.

The fabric softener formulations were washed according to the following procedure: Cotton terry towels, prewashed with an unperfumed liquid detergent at 90° C., were placed in a Miele PW 6065 Vario washing machine along with a ballast load of large cotton towels. The total load was 2.0 kg. A washing cycle was performed at 40° C. (spin drying: 900 rpm). 40 mL of a fabric softener formulation previously prepared was added during the rinsing process. The cotton terry towels (30 cm*20 cm, each about 50 g) were dried for 24 hours at room conditions.

The intensity of the fragrance was then assessed before and after they were rubbed against hands as a blind experiment by a panel of five trained assessors. Scores were given on an interval scale from 0 (non-noticeable scent) to 5 (very strong scent). The average score before and after rubbing is shown in the table below.

TABLE 16

| | Averaged olfactory performances | |
|---|---|---|
| Example | Before rubbing | After rubbing |
| Ex. 5-1 | 0.0 | 2.6 |
| Ex. 5-2 | 0.0 | 2.5 |
| Ex 5-3 | 0.1 | 2.8 |
| Ex 5-4 | 0.3 | 2.9 |
| Ex. 5-5 | 0.0 | 3.0 |
| Ex. 5-6 | 0.0 | 3.0 |
| Ex. 5-7 | 0.1 | 2.0 |
| Ex. 5-8 | 0 | 3.2 |
| Ex. 6-1 | 0.1 | 2.1 |
| Ex. 6-2 | 0.0 | 3.0 |
| Ex. 6-3 | 0.3 | 3.1 |
| Ex. 6-4 | 0.1 | 3.6 |
| Ex. 7-1 | 0.1 | 1.9 |
| Ex. 7-2 | 0.0 | 2.8 |

These results show that the aqueous dispersions of microcapsules of the invention survive to the washing cycle and release their fragrance once rubbed when dried.

TABLE 15

| Example | Fragrance | Weight of trimethylolpropane tris(3-mercaptopropionate) (g) | Weight of 10% PVA aqueous solution in the initial aqueous phase (g) | Weight of water in the initial aqueous phase (g) | Weight of emulsion, X (g) | Weight of 10% PVA aqueous solution in the reactor, Y (g) | Microcapsules median volume diameter (D(v, 0.5)) (μm) |
|---|---|---|---|---|---|---|---|
| Ex. 7-1 | A | 1.26 | 2.0 | 199 | 359.6 | 39.7 | 17.3 |
| Ex. 7-2 | A | 1.40 | 2.8 | 160.5 | 322.2 | 56.2 | 6.8 |

Example 9: Biodegradability of the Polymeric Shell of the Microcapsules

The polymer of the microcapsules shell was extracted from the aqueous dispersion of microcapsules by different washings with excess of water and ethanol, until there were no more residues of volatile organic compounds (fragrance and monomers). Filtration was performed on a Sartorius Quantitative Grade 393 Filter paper. The polymer was obtained under the form of a white powder which was then dried at room temperature for three weeks. Residues were quantified by ethanol extraction and GC-MS/FID analysis and represented less than 0.1% by weight of the powder.

The biodegradability of the polymer was determined following the OECD Guideline for testing of chemicals 301 F: Manometric respirometry (adopted on 17 Jul. 1992).The biodegradability test under the OECD 301 F method is based on the measurement of the oxygen consumed by bacteria to mineralize the test substance, i.e. the Biochemical Oxygen Demand (BOD). The BOD is deduced from the pressure variation measured in the test vial using an OxiTop® device.

The polymer of the microcapsules shell (hereafter "test item") was introduced in a mineral medium inoculated with aerobic micro-organisms not pre-adapted at a temperature controlled at 20±2° C., in a manometric respirometer. The biodegradability was followed along the incubation period extended to 60 days, as recommended in the Annex XV Restriction Report, proposal for restriction intentionally added microplastics (European Chemical Agency, August 2019). The test item was studied at a concentration corresponding to 100 mg Theoretical Oxygen Demand/L and was used as sole organic source for microbial flora.

The $CO_2$ released during the experiment was absorbed by concentrated NaOH. The amount of oxygen taken up by the microbial population during biodegradation of the test item (corrected for uptake by blank controls) allowed the specific Biochemical Oxygen Demand (BOD) calculation.

Biodegradation was calculated from the rate of BOD and was expressed as a percentage of Theoretical Oxygen Demand (ThOD$NH_3$).

Test Conditions

Test System

Respirometric OxiTop® device in which sodium hydroxide pellets were introduced in order to capture the $CO_2$ released by the bacteria. The measuring system consists of reaction vessels (9 test flasks of 500 mL), each with a $CO_2$ absorber, a magnetic stirring and a measuring head (the measuring heads record and save the pressure difference semi-continuously throughout the experiment).

Vessel: cylindrical glass vessel of 500 mL capacity containing 365 mL of mineral medium (except toxicity control: 215 mL).

Inoculum: prepared from activated sludge sampled in the aeration tank treatment plant receiving predominantly domestic sewage (urban wastewater, France). The sample is taken within 24 hours before analysis and the wastewater was previously decanted before use.

150 mL of inoculum are added in 5 L of mineral medium and then distributed in the test flask with appropriate volume.

Test item: containing the test item at a concentration corresponding to 100 mg ThOD/L in inoculated medium—3 vessels

Control blank control (inoculated medium)—2 vessels
procedure control: control item (sodium acetate) at a concentration corresponding to 100 mg ThOD/L to check the activity of the inoculum—1 vessel
toxicity control: to check any inhibitory effect of the compound (test item and control item)
abiotic sterile control: test item at a concentration corresponding to 100 mg ThOD/L to check any abiotic degradation (sterilising agent)—1 vessel
sterile control: mineral medium and sterilising agent—1 vessel.

Composition of the Mineral Medium

All the chemicals were of recognized analytical grade purity. The dilution water was high quality deionized water with a low carbon content (TOC<1 mg/L). pH of the mineral medium was 7.4±0.2.

Composition of the mineral medium is given in the table below.

TABLE 17

| Reagent | Formula | Concentration of reagent in the mineral medium |
|---|---|---|
| Potassium dihydrogen phosphate | $KH_2PO_4$ | 85 mg/L |
| Potassium hydrogen phosphate | $K_2HPO_4$ | 218 mg/L |
| Sodium hydrogen phosphate dihydrate | $Na_2HPO_4, 2H_2O$ | 334 mg/L |
| Ammonium chloride | $NH_4Cl$ | 5 mg/L |
| Calcium chloride | $CaCl_2$ | 27.5 mg/L |
| Magnesium sulfate heptahydrate | $MgSO_4, 7H_2O$ | 22.5 mg/L |
| Iron III chloride hexahydrate | $FeCl_3, 6H_2O$ | 0.25 mg/L |

Evaluation of Biodegradability

The test vial is hermetically closed. Therefore, the pressure variation inside the test vial results only from the consumption of oxygen by the bacteria. Each control or sample is analysed in triplicate. The test vials are placed in a cabinet thermostatically controlled at 20±2° C., with continuous magnetic stirring, for a period of 60 days. The pressure in the test vials is measured once a day.

The biodegradability analysis of an organic substance by monitoring the bacterial respiration (oxygen uptake for mineralisation) requires determining the Theoretical Oxygen Demand (ThOD$_{NH3}$) of this substance. This was determined by calculation based on the results from the elemental analysis of the substance (% C, % H, % N, % O and % S).

The Biochemical Oxygen Demand (BOD) (mg $O_2$/mg test item) was determined after each time period by dividing the oxygen uptake (mg) of the test item, corrected that by the blank inoculum control, by the concentration of the test item used:

$$BOD = \frac{\text{mg O2 uptake by test item} - \text{mg O2 uptake by blank}}{\text{Concentration of the test item in vessel}} =$$

mg O2/mg test item

The percentage of biodegradation or biodegradation rates at time t is calculated from:

$$\% \text{ biodegradation} = \% \, ThODNH3 = \frac{BOD(\text{mg } O2/\text{mg test item})}{ThOD_{NH3}} \times 100$$

The determined biodegradation rates are given in the table below:

TABLE 18

| Example | Biodegradation rate (%) | |
| --- | --- | --- |
| | After 28 days | After 60 days |
| Ex. 2-1 | — | 62 ± 1 |
| Ex 6-1 | 65 ± 1 | 71 ± 3 |
| Ex 7-1 | — | 70 ± 4 |

The margins of errors correspond to the standard deviations.

Polymers extracted from the aqueous dispersion of microcapsules of the invention are biodegradable and are not considered as microplastics according to the definitions provided in the Annex XV Restriction Report, proposal for restriction intentionally added microplastics (European Chemical Agency, August 2019). They demonstrate biodegradability in 28 and 60 days (groups 1 and 2 defined in the Annex).

Example 10: Influence of the Addition of a Solvent in a Fabric Softener on the Fragrance Leakage During Storage The fragrance released in a fabric softener was determined through extraction with solvent and analysis by gas chromatography (GC). The fragrance leakage was determined as the ratio of fragrance released in the fabric softener to the encapsulated fragrance.

Details of the Method

Procedure

A mixture containing 0.5 wt % of aqueous dispersion of microcapsules (hereafter "slurry") and 99.5 wt % of commercial Downy® Ultra Free & Gentle Liquid Fabric Conditioner was stored in a glass bottle in an oven at the controlled temperature of 60° C. for 3 days. Then, the glass bottle was shaken manually to homogeneize the mixture. In order to separate the microcapsules, the sample was filtrated on Versapor® 5 µm filters, and then on Versapor® 1.2 µm filters. 1 g of this filtrate was mixed with 1 g of Celite® 545. Then, 5 mL of pentane and 50 µL of an internal standard solution (a solution of methyl decanoate in cyclohexane at a concentration of 10 mg/mL) were added. The mixture was agitated on a roller bed for 1 hour. The supernatant was filtrated on 0.45 µm Acrodisc® filter, and was then injected in a Gas Chromatography apparatus using a Flame Ionization Detector (GC/FID). Integration areas were determined from the FID signal using Agilent Chemstation software. Each sample was analysed in triplicate.

Instrumentation

Agilent 6890 GC connected to Chemstation software
Column: HP-5MS, 30 m×0.25 mm×0.25 µm Oven temperature: 50° C. for 2 minutes, then heat to 280° C. at 8° C./min and hold at 280° C. for 5 minutes.
Injector: 250° C., Detector: 250° C.
2 µL injection volume (splitless)

Calculations

Determination of the weight of leaked fragrance component i in the sample:

$$W_{perf,i} = \frac{A_{perf,i} \times w_{IS}}{A_{IS}}$$

$W_{perf,i}$: weight of leaked fragrance component i (mg)
$A_{perf,i}$: fragrance component i area
$w_{IS}$: weight of internal standard (mg)
$A_{IS}$: internal standard area Determination of the weight of leaked fragrance in the sample:

$$W_{frag} = \sum_i W_{perf,i}$$

$W_{frag}$: weight of leaked fragrance (mg)
Determination of the theoretical weight of fragrance in the sample for a total leakage:

$$W_{frag-theo} = \frac{\% \text{ frag slurry} \times \% \text{ slurry}}{W_{softener} \times 100}$$

$W_{frag-theo}$: theoretical weight of fragrance in the sample for a total leakage (mg)
% frag slurry: percentage of fragrance in slurry
% slurry: percentage of slurry in the fabric softener
$W_{softener}$: fabric softener weight for extraction (mg)
Determination of the theoretical weight of fragrance component i in the sample for a total leakage:

$$W_{perf-theo} = \frac{\% \text{ frag slurry} \times \% \text{ perf}, i \times \% \text{ slurry}}{W_{softener} \times 100}$$

$W_{perf-theo}$: theoretical weight of fragrance component i in the sample for a total leakage (mg)
% slurry: percentage of slurry in the fabric softener
% perf,i: percentage of fragrance component i in the fragrance
Determination of the percentage of fragrance leakage:

$$\% \text{ leakage}_{frag} = \frac{W_{frag}}{W_{frag-theo}} \times 100$$

% leakage$_{frag}$: percentage of fragrance leakage
Determination of the percentage of leakage of fragrance component i:

$$\% \text{ leakage}_{perf} = \frac{W_{perf}}{W_{perf-theo}} \times 100$$

% leakage$_{perf,i}$: percentage of leakage of fragrance component i:

Results

TABLE 19

| Example | Fragrance and possible solvent | Leakage of fragrance A after 3 days at 60° C. in a fabric softener |
|---|---|---|
| Ex. 2-1 | 100% of fragrance A | 32.4 |
| Ex. 5-8 | 80 wt % of fragrance A + 20 wt % of isopropyl myristate | 20.6 |

These results show that the addition of a hydrophobic solvent, such as isopropyl myristate, in the fragrance, reduces the fragrance leakage during storage in a fabric softener.

The invention claimed is:

1. An aqueous dispersion of microcapsules, said microcapsules comprising a hydrophobic core and a polymeric shell wherein said polymeric shell is formed of the reaction product of:
   (i) at least one multifunctional $\alpha,\beta$-unsaturated carbonyl compound,
   (ii) at least one nanocellulose or microcrystalline cellulose,
   (iii) optionally, at least one monoethylenically $\alpha,\beta$-unsaturated carbonyl compound and/or poly(alkylene itaconate),
   (iv) optionally, at least one monofunctional and/or multifunctional thiol compound, and
   (v) optionally, at least one silyl (meth)acrylate compound, and
   wherein the weight ratio between the multifunctional $\alpha,\beta$-unsaturated carbonyl compound(s) (i) and the nanocellulose or microcrystalline cellulose (ii) is lower or equal to 1.

2. The aqueous dispersion of claim 1, wherein the at least one multifunctional $\alpha,\beta$-unsaturated carbonyl compound (i) is selected from the group consisting of a multifunctional (meth)acrylate compound, an anhydride and a multifunctional (meth)acrylamide compound.

3. The aqueous dispersion of claim 2, wherein the at least one multifunctional $\alpha,\beta$-unsaturated carbonyl compound (i) is a multifunctional (meth)acrylate compound.

4. The aqueous dispersion of claim 3, wherein the multifunctional (meth)acrylate compound is an ester of (meth)acrylic acid with a linear or branched, alicyclic, aromatic or heterocyclic ($C_2$-$C_{24}$)alcohol, or an ester of (meth)acrylic acid with a ($C_2$-$C_{24}$)polyethylene glycol.

5. The aqueous dispersion of claim 4, wherein the multifunctional (meth)acrylate compound is selected from the group consisting of glycerol dimethacrylate, ethylene glycol dimethacrylate, 1,3-butylene glycol dimethacrylate, 1,4-butylene glycol dimethacrylate, 1,2-propylene glycol dimethacrylate, 1,3-propylene glycol dimethacrylate, diethylene glycol dimethacrylate, 1,6-hexane diol dimethacrylate, bisphenol A dimethacrylate, bisphenol A ethoxylate dimethacrylate, pentaerythritol trimethacrylate, glycerol trimethacrylate, trimethylolpropane trimethacrylate, tris-2-hydroxyethyl isocyanurate trimethacrylate, ethoxylated pentaerythritol tetramethacrylate, 1,4-butylene glycol diacrylate, ethylene glycol diacrylate, diethylene glycol diacrylate, triethylene glycol diacrylate, neopentylglycol diacrylate, triglycerol diacrylate, 1,6-hexane diol diacrylate, trimethylolpropane triacrylate, trimethylolpropane ethoxylate triacrylate, trimethylolpropane propoxylate triacrylate, pentaerythritol triacrylate, tris-2-hydroxyethyl isocyanurate triacrylate, glycerol triacrylate, pentaerythritol tetraacrylate, di-trimethylolpropane tetraacrylate, dipentaerythritol pentaacrylate, dipentaerythritol hexaacrylate, tris[2-(acryloyloxy)ethyl]isocyanurate, 2-[4,6-bis(2-propenoyloxyethyl)-1,3,5-triazin-2-yl]ethyl prop-2-enoate, and mixtures thereof.

6. The aqueous dispersion of claim 5, wherein the multifunctional (meth)acrylate compound is selected from the group consisting of glycerol dimethacrylate, 1,4-butylene glycol dimethacrylate, ethylene glycol dimethacrylate, trimethylolpropane trimethacrylate, glycerol trimethacrylate, pentaerythritol triacrylate, 1,4-butylene glycol diacrylate, ethylene glycol diacrylate, trimethylolpropane triacrylate, glycerol triacrylate, pentaerythritol tetraacrylate, di-trimethylolpropane tetraacrylate, and mixtures thereof.

7. The aqueous dispersion of claim 1, wherein the weight ratio between the multifunctional $\alpha,\beta$-unsaturated carbonyl compound(s) (i) and the nanocellulose or microcrystalline cellulose (ii) ranges from 0.1 to 1.

8. The aqueous dispersion of claim 1, wherein the nanocellulose or microcrystalline cellulose (ii) is in the form of fibrils having a median volume diameter (D(v; 0.5)) ranging from 150 nm to 8 µm.

9. The aqueous dispersion of claim 1, wherein the nanocellulose or microcrystalline cellulose (ii) is dispersible in a solvent or a fragrance with a Log P of at least 1.5.

10. The aqueous dispersion of claim 1, wherein the polymeric shell comprises at least one monoethylenically $\alpha,\beta$-unsaturated carbonyl compound and/or poly(alkylene itaconate) (iii) selected from the group consisting of methacrylic acid, itaconic acid, 2-hydroxyethyl methacrylate, 2-hydroxyethyl acrylate, methyl methacrylate, ethyl methacrylate, isopropyl methacrylate, isobornyl methacrylate, and mixtures thereof.

11. The aqueous dispersion of claim 1, wherein the polymeric shell comprises at least one multifunctional thiol compound (iv) selected from the group consisting of ethylene glycol bismercaptoacetate, glycol dimercaptoacetate, 1,8-dimercapto-3,6-dioxaoctane, dimercaptodiethyl sulfide, 1,6-hexanedithiol, propane-1,2,3-trithiol, 1,2-bis[(2-mercaptoethyl)thio]-3-mercaptopropane, tetrakis(7-mercapto-2,5-dithiaheptyl]methane, trimethylolpropane tris(2-mercaptoacetate), pentaerythritol tetrakis(2-mercaptoacetate), ethylene glycol bis(3-mercaptopropionate), dipentaerythritol hexakis(3-mercaptopropionate), 1,4-butanediol bis(3-mercaptopropionate), polycaprolactone tetra(3-mercaptopropionate), tris[2-(3-mercaptopropionyloxy)ethyl] isocyanurate, tetraethylene glycol bis(3-mercaptopropionate), ethoxylated trimethylolpropane tri (3m-ercapto-propionate), trimethylolethane trimercaptoacetate, 1,4-butanediol bismercaptoacetate, trithiocyanuric acid, pentaerythritol tetrakis(3-mercaptopropionate), trimethylolpropane tris(3-mercaptopropionate), trimethylolpropane tris(3-mercaptobutyrate), 1,4-butanediol bis(3-mercaptobutyrate), poly-2-mercaptoacetate, benzene-1,2-dithiol, 1,4-butanedithiol, 4,4'-biphenyldithiol, benzene-1,4-dithiol, toluene-3,4-dithiol, 1,4-dithiothreitol, 1,3,4-thiadiazole-2,5-dithiol, 1,3,5-benzenetrithiol, 4,4'-bis(mercaptomethylbiphenyl), 1,3,5-tris(3-mercaptobutyryloxyethyl)-1,3,5-triazine-2,4,6(1H,3H,5H)-trione, 3,7-dithia-1,9-nonanedithiol, and mixtures thereof.

12. The aqueous dispersion of claim 11, wherein the at least one multifunctional thiol compound (iv) is selected from the group consisting of ethylene glycol bismercaptoacetate, glycol dimercaptoacetate, trimethylolpropane tris(3-mercaptopropionate), pentaerythritol tetrakis(3-mercaptopropionate), and mixtures thereof.

13. The aqueous dispersion of claim 1, wherein the polymeric shell comprises at least one monofunctional thiol compound (iv) selected from the group consisting of 1-octanethiol, 1-decanethiol, 1-dodecanethiol, tert-octanethiol, tert-dodecanethiol, thioglycolic acid, and mixtures thereof.

14. The aqueous dispersion of claim 1, wherein the aqueous dispersion comprises solid colloidal inorganic particles.

15. The aqueous dispersion of claim 1, wherein the polymeric shell comprises at least one silyl (meth)acrylate compound (v) selected from the group consisting of trimethylsilyl (meth)acrylate, triethylsilyl (meth)acrylate, tripropylsilyl (meth)acrylate, triisopropylsilyl (meth)acrylate, tributylsilyl (meth)acrylate, tri-sec-butylsilyl (meth)acrylate, triisobutylsilyl (meth)acrylate, sec-butylmethylsilyl (meth)acrylate, sec-butyldimethylsilyl (meth)acrylate, dimethylpropylsilyl (meth)acrylate, monomethyldipropylsilyl (meth)acrylate, and methylethylpropylsilyl (meth)acrylate, 3-(trimethoxysilyl)propyl (meth)acrylate, 3-(triethoxysilyl)propyl (meth)acrylate, 3-(trichlorosilyl)propyl (meth)acrylate, and mixtures thereof.

16. The aqueous dispersion of claim 1, wherein the hydrophobic core comprises a fragrance.

17. A process for the manufacture of an aqueous dispersion of claim 1, comprising the following steps:
 a—providing an oil-in-water emulsion having an oil phase and an aqueous phase, wherein the oil phase comprises the constituent(s) of the hydrophobic core, and the oil phase or the aqueous phase comprises at least one multifunctional α,β-unsaturated carbonyl compound (i), at least one nanocellulose or microcrystalline cellulose (ii), optionally at least one monoethylenically α,β-unsaturated carbonyl compound(s) and/or poly(alkylene itaconate) (iii), optionally at least one monofunctional and/or multifunctional thiol compound (iv), optionally at least one silyl acrylate compound (v), optionally a polymeric stabilizer, and optionally solid colloidal inorganic particles, according to whether the compounds (i), (ii), (iii), (iv), (v), polymeric stabilizer, and solid colloidal inorganic particles, are oil-soluble or water-soluble, said oil-in-water emulsion being obtainable by mixing,
 b—triggering polymerization by free-radical polymerization of the emulsion obtained in step a—, and
 c—letting the polymerization propagate thereby obtaining microcapsules.

18. The process of claim 17, wherein in step a—the oil phase comprises the constituent(s) of the hydrophobic core, the at least one multifunctional α,β-unsaturated carbonyl compound (i), the at least one nanocellulose or microcrystalline cellulose (ii), optionally the at least one monoethylenically α,β-unsaturated carbonyl compound(s) and/or poly(alkylene itaconate) (iii), optionally the at least one monofunctional and/or multifunctional thiol compound (iv), and optionally the at least one silyl acrylate compound (v), and the aqueous phase comprises optionally the polymeric stabilizer, and optionally the solid colloidal inorganic particles.

19. A consumer product comprising an aqueous dispersion of claim 1.

20. The consumer product of claim 19, which is a laundry product, a personal care product or a cosmetic product.

* * * * *